United States Patent
Sato

(10) Patent No.: US 11,821,855 B2
(45) Date of Patent: Nov. 21, 2023

(54) SAMPLE HOLDER FOR SINGLE-CRYSTAL X-RAY STRUCTURE ANALYSIS APPARATUS, SAMPLE HOLDER UNIT, AND SOAKING METHOD THEREFOR

(71) Applicant: Rigaku Corporation, Tokyo (JP)

(72) Inventor: Takashi Sato, Tokyo (JP)

(73) Assignee: Rigaku Corporation, Tokyo (JP)

( * ) Notice: Subject to any disclaimer, the term of this patent is extended or adjusted under 35 U.S.C. 154(b) by 186 days.

(21) Appl. No.: 17/295,863

(22) PCT Filed: Nov. 21, 2019

(86) PCT No.: PCT/JP2019/045700
§ 371 (c)(1),
(2) Date: May 20, 2021

(87) PCT Pub. No.: WO2020/105726
PCT Pub. Date: May 28, 2020

(65) Prior Publication Data
US 2022/0011247 A1    Jan. 13, 2022

(30) Foreign Application Priority Data

Nov. 22, 2018    (JP) ................. 2018-219780

(51) Int. Cl.
*G01N 1/28* (2006.01)
*G01N 23/20* (2018.01)
(Continued)

(52) U.S. Cl.
CPC ......... *G01N 23/20025* (2013.01); *G01N 1/28* (2013.01); *G01N 23/205* (2013.01); *G01N 23/207* (2013.01)

(58) Field of Classification Search
CPC ............. G01N 23/207; G01N 23/205; G01N 23/20025; G01N 2223/604; G01N 1/28
See application file for complete search history.

(56) References Cited

U.S. PATENT DOCUMENTS

| 6,918,698 B2 | 7/2005 | Nordmeyer et al. |
| 7,156,917 B2 | 1/2007 | Moriyama et al. |

(Continued)

FOREIGN PATENT DOCUMENTS

| EP | 1 479 794 A2 | 11/2004 |
| JP | H06-194276 A | 7/1994 |

(Continued)

OTHER PUBLICATIONS

European Patent Office, EP Search Report issued in EP Application No. 19 886 634.5, Munich Germany, dated Sep. 16, 2022, 8 pages.

(Continued)

*Primary Examiner* — Mark R Gaworecki
(74) *Attorney, Agent, or Firm* — ASLAN LAW, P.C.

(57) ABSTRACT

A sample holder capable of quickly and precisely performing single-crystal X-ray structure analysis by quickly and easily soaking a sample in a crystalline sponge, and also a sample holder unit and a soaking method therefor are provided. There are provided a sample holder used in a single-crystal X-ray structure analysis apparatus is provided, the sample holder comprising a base part attached to a goniometer in the single-crystal X-ray structure analysis apparatus; a sample holding part formed in the base part to hold the porous complex crystal capable of soaking the sample in a plurality of fine pores formed therein; and a sample introduction structure formed in the base part and introducing the sample to be soaked in the porous complex.

26 Claims, 14 Drawing Sheets

(51) Int. Cl.
　　　*G01N 23/20025*　　(2018.01)
　　　*G01N 23/205*　　(2018.01)
　　　*G01N 23/207*　　(2018.01)

(56) References Cited

U.S. PATENT DOCUMENTS

| | | |
|---|---|---|
| 7,274,769 B2 | 9/2007 | Nordmeyer et al. |
| 7,696,991 B2 | 4/2010 | Higashi |
| 10,190,952 B2 | 1/2019 | Fujita et al. |
| 10,684,198 B2 | 6/2020 | Fujita et al. |
| 2003/0152194 A1 | 8/2003 | Nordmeyer et al. |
| 2004/0231580 A1 | 11/2004 | Moriyama et al. |
| 2005/0163280 A1 | 7/2005 | Nordmeyer et al. |
| 2007/0005268 A1 | 1/2007 | Higashi |
| 2007/0228049 A1 | 10/2007 | Nordmeyer et al. |
| 2015/0219533 A1 | 8/2015 | Fujita et al. |
| 2017/0219500 A1 | 8/2017 | Fujita et al. |
| 2019/0137367 A1 | 5/2019 | Fujita et al. |

FOREIGN PATENT DOCUMENTS

| | | |
|---|---|---|
| JP | H11-304999 A | 11/1999 |
| JP | 2003-083412 A | 3/2003 |
| JP | 2007-003394 A | 1/2007 |
| JP | 2013-156218 A | 8/2013 |
| JP | WO 2014/038220 A1 | 3/2014 |
| JP | 2014-130063 A | 7/2014 |
| JP | WO 2016/017770 A1 | 7/2017 |
| JP | 2018-155680 A | 10/2018 |
| WO | WO 2011/115223 A1 | 9/2011 |
| WO | WO 2015/132909 A1 | 9/2015 |

OTHER PUBLICATIONS

Yasuhide Inokuma, Makoto Fujita et al; "X-ray analysis on the nanogram to microgram scale using porous complexes"; Nature 495, 461-466; Mar. 28, 2013.

Hoshino et al., "The crystalline sponge method updated", IUCrJ, (2016), 3, 139-151.

Yasuhide Inokuma, "'Crystal sponge' method overturns common sense of crystal structure analysis", Chemistry, vol. 68, No. 8, pp. 35-40, in particular, p. 39, fig.5, non-officieal translataion, Aug. 1, 2013.

Inokuma, Yasuhide et al, "X-ray crystallography of extremely small amount of compounds by crystal sponge method", Farumashia, 2014, vol. 50, No. 8, pp. 756-761, col. 5. Application of crystal sponge method, fig. 4, non-official translation.

Japan Patent Office, JP Office Action issued in JP Application No. 2020-557652, Japan, dated Apr. 11, 2023, 3 pages.

SAMPLE HOLDER FOR SINGLE-CRYSTAL X-RAY STRUCTURE ANALYSIS APPARATUS, SAMPLE HOLDER UNIT, AND SOAKING METHOD THEREFOR

CROSS-REFERENCE TO RELATED APPLICATIONS

This application claims priority to JP Patent Application No. 2018-219780 filed on Nov. 22, 2018, and this application claims priority to and is a 371 of international PCT Application No. PCT/JP2019/045700 filed on Nov. 21, 2019, the entire contents of which are hereby incorporated by reference.

TECHNICAL FIELD

The present invention relates to a next-generation single-crystal X-ray structure analysis apparatus capable of analyzing a structure of a material by an aggregative microstructure such as its atomic or molecular arrangement; and relates specifically to a sample holder for a single-crystal X-ray structure analysis apparatus that is a tool for performing processes including preparation of a single-crystal sample to be an analysis object, and to a sample holder unit and a soaking method therefor.

BACKGROUND ART

In research and development for new devices and materials, synthesis and evaluation of the materials and determination of the next research policy based on the foregoing are ordinarily performed. In a structure analysis of a material using X-ray diffraction for performing material development in a short period of time, a search method of a material structure centering on the material structure analysis capable of efficiently performing the structure analysis, and an X-ray structure analysis used therein are indispensable for efficiently searching the material structure that realizes the function/physical property of an object material.

However, it has been difficult for those other than X-ray specialists to perform the structure analysis based on the results obtained by the foregoing method. Therefore, an X-ray structure analysis system with which the structure analysis can be performed by anyone who is not a specialist of X-rays has been demanded. In this regard, as is known from the following Patent Document 1, the single-crystal X-ray structure analysis has gained attention as a method capable of obtaining a precise and highly accurate three-dimensional structure of molecules.

On the other hand, in this single-crystal X-ray structure analysis, there has been a large constraint that a single-crystal needs to be prepared by crystallizing a sample. However, as is known from not only the following Non-Patent Documents 1 and 2 but also Patent Document 2, the single-crystal X-ray structure analysis becomes widely applicable for those including a liquid compound that cannot be crystallized, a sample incapable of acquiring a sufficient amount for crystallization, and so forth via development of a material called "crystalline sponge" (for example, a porous complex crystal in which countless pores each having a diameter of 0.5 to 1 nm are formed).

PRIOR ART DOCUMENT

Patent Document

Patent Document 1: Japanese Unexamined Patent Application Publication No. 2007-3394
Patent Document 2: Re-publication of PCT International Publication WO2016/017770

Non-Patent Document

Non-Patent Document 1: Makoto Fujita; X-ray analysis on the nanogram to microgram scale using porous complexes; Nature 495, 461-466; 28 Mar. 2013
Non-Patent Document 2: Hoshino et al. (2016), The updated crystalline sponge method IUCrJ, 3, 139-151

SUMMARY OF THE INVENTION

Problems to be Solved by the Invention

However, in the single-crystal X-ray structure analysis as becoming a conventional technique in which the above-described crystalline sponge is used, it is necessary to quickly and accurately perform a step of soaking a sample of a very small amount of approximately several ng to several μg separated by various devices in a framework of a very small and fragile crystalline sponge having a size of approximately 100 μm, and further a step accompanying fine and precise operations where the very small crystalline sponge in which the sample is soaked is taken out; is attached to a tool; and is installed at the X-ray irradiation position inside a single-crystal X-ray structure analysis apparatus. In addition, these fine and precise operations carried out in a short period of time largely affect the measurement result of the sample after being soaked in the crystalline sponge, thereby being very important operations.

Accordingly, the present invention has been achieved in view of problems in the above-described conventional technique, and the objective is, specifically, to provide a sample holder and a sample holder unit each capable of quickly, surely and easily performing single-crystal X-ray structure analysis with a crystalline sponge without conventional fine and precise operations for which rapidness is required being accompanied, the operations including a removal of a sample soaked in a very small and fragile crystalline sponge and an attachment operation to an apparatus, even without having specialized knowledge of X-ray structure analysis, in other words, to provide the sample holder and the sample holder unit each used in a single-crystal X-ray structure analysis in order to realize a high-yield, efficient, very versatile and user-friendly single-crystal X-ray structure analysis apparatus.

Means to Solve the Problems (1) In order to achieve the above-described object, it is a feature that the sample holder according to the present invention is a sample holder used in a single-crystal X-ray structure analysis apparatus, the sample holder comprising a base part attached to a goniometer in the single-crystal X-ray structure analysis apparatus, a sample holding part formed in the base part to hold the porous complex crystal capable of soaking the sample in a plurality of fine pores formed therein, and a sample introduction structure formed in the base part and introducing the sample to be soaked in the porous complex crystal.

(2) Further, it is a feature that in the sample holder according to the present invention, the sample holding part is formed in a protrusion shape extending from the base part, and is holding the porous complex crystal at a tip part thereof; and the sample is soaked in the porous complex crystal in a state of being held by the sample holding part.

(3) Further, it is a feature that in the sample holder according to the present invention, a through-hole passing from the base part to the tip part in the protrusion shape is formed in the sample holding part, and the sample is soaked in the porous complex crystal in a state of being held inside the through-hole.

(4) Further, it is a feature that in the sample holder according to the present invention, the sample holding part is formed as a through-hole in a protrusion shape extending from the base part, and is having a sample holding area inside the through-hole; and the porous complex crystal in which the sample is soaked moves into the sample holding area from the outside of the sample holding area, and is held in the sample holding area.

(5) Further, it is a feature that in the sample holder according to the present invention, the tip part of the through-hole is formed in a reverse taper shape, and the porous complex crystal is held in a narrowed part at a boundary of the reverse taper shape.

(6) Further, it is a feature that in the sample holder according to the present invention, the tip part of the through-hole is formed in a taper shape, and the porous complex crystal is held in a narrowed part at a boundary of the taper shape.

(7) Further, it is a feature that in the sample holder according to the present invention, the sample introduction structure comprises the through-hole, and the through-hole is used for introducing or discharging the sample.

(8) Further, it is a feature that in the sample holder according to the present invention, the sample holding part is made of an X-ray translucent material.

(9) Further, it is a feature that the sample holder unit according to the present invention is a sample holder unit comprising a sample holder used in a single-crystal X-ray structure analysis apparatus and an applicator for storing the sample holder, the sample holder comprising a base part attached to a goniometer in the single-crystal X-ray structure analysis apparatus, a sample holding part formed in the base part and holding the porous complex crystal capable of soaking the sample in a plurality of fine pores formed therein, and a sample introduction structure that introduces the sample for soaking the sample in the porous complex, and the applicator comprising a storing space for storing the sample holder and an opening, and a seal part provided on a contact surface with the sample holder stored in the storing space, wherein the sample introduced through the sample introduction structure is soaked in the porous complex crystal in a state where the sample holder is stored in the applicator.

(10) Further, it is a feature that in the sample holder unit according to the present invention, the sample holding part is formed in a protrusion shape extending from the base part, to hold the porous complex crystal at a tip part thereof; and the sample is soaked in the porous complex crystal in a state where the porous complex crystal is held by the sample holding part.

(11) Further, it is a feature that in the sample holder unit according to the present invention, the sample holding part is formed in a protrusion shape extending from the base part; the sample introduction structure is a through-hole passing from the base part to the sample holding part; and the sample introduced into the through-hole is soaked in the porous complex crystal in a state where the porous complex crystal is held inside the through-hole.

(12) Further, it is a feature that in the sample holder unit according to the present invention, a tip part of the through-hole in the sample holder is formed in a reverse taper shape, and the porous complex crystal is held in a narrowed part at a boundary with the reverse taper shape.

(13) Further, it is a feature that in the sample holder unit according to the present invention, a tip part of the through-hole in the sample holder is formed in a taper shape, and the porous complex crystal is held in a narrowed part at a boundary with the taper shape.

(14) Further, it is a feature that in the sample holder unit according to the present invention, the sample introduction structure of the sample holder comprises the through-hole, and the through-hole is used for introducing or discharging the sample.

(15) Further, it is a feature that in the sample holder unit according to the present invention, the sample holding part is made of an X-ray translucent material.

(16) Further, it is a feature that the sample holder unit according to the present invention is a sample holder unit comprising a sample holder used in a single-crystal X-ray structure analysis apparatus and an applicator in which the sample holder is stored, the sample holder comprising a base part attached to a goniometer in the single-crystal X-ray structure analysis apparatus, a sample holding part formed in the base part and having the sample holding area inside, and a sample introduction structure for introducing the sample and to be soaked in the porous complex crystal; and the applicator comprising a storing space for storing the sample holder and an opening, a seal part provided on a contact surface with the sample holder stored in the storing space, and the porous complex crystal capable of soaking the sample in a plurality of fine pores formed therein; and the porous complex crystal soaking the sample introduced through the sample introduction structure in a state where the sample holder is stored in the applicator; and the sample holding part formed as a through-hole in a protrusion shape extending from the base part has a sample holding area inside the through-hole; and the porous complex crystal in which the sample is soaked moves into the sample holding area from the outside of the sample holding area, and is held in the sample holding area.

(17) Further, it is a feature that in the sample holder unit according to the present invention, a tip part of the through-hole is formed in a reverse taper shape, and the porous complex crystal in which the sample is soaked is held in a narrowed part at a boundary with the reverse taper shape.

(18) Further, it is a feature that in the sample holder unit according to the present invention, a tip part of the through-hole is formed in a taper shape, and the porous complex crystal in which the sample is soaked is held in a narrowed part at a boundary with the taper shape.

(19) Further, it is a feature that in the sample holder unit according to the present invention, the sample introduction structure of the sample holder comprises the through-hole, and the through-hole is used for introducing or discharging the sample.

(20) Further, it is a feature that in the sample holder unit according to the present invention, the sample holding area is made of an X-ray translucent material.

(21) Further, it is a feature that the soaking method according to the present invention is a soaking method for soaking a sample in a porous complex crystal, the method comprising a setting step of setting, to a soaking apparatus, a sample holder comprising a sample introduction structure into which the sample is introduced; and a sample holding part formed in a protrusion shape as a through-hole, the sample holding part having a sample holding area for holding the porous complex crystal in a predetermined area inside the through-hole, and an applicator having a storing space for storing the sample holder and an opening; an insertion step of inserting a sample introduction pipe of the soaking apparatus in the sample introduction structure; an introduction step of introducing the sample thereinto through the sample introduction pipe; and a soaking step of soaking the introduced sample in the porous complex crystal.

(22) Further, it is a feature that the soaking method according to the present invention further comprises a holding step of holding, in the sample holding area, the porous complex crystal moved into the sample holding area in the sample holding part from the outside of the sample holding area in the sample holding part, after the soaking step, wherein the porous complex crystal is arranged in the storing space, and in the soaking step, the sample introduced into the storing space is soaked in the porous complex crystal.

(23) Further, it is a feature that the soaking method according to the present invention further comprises a holding step of holding, in the sample holding area, the porous complex crystal moved into the sample holding area in the sample holding part from the outside of the sample holding area in the sample holding part, before the soaking step, wherein in the soaking step, the sample introduced into the sample holding area is soaked in the porous complex crystal.

(24) Further, it is a feature that as to the soaking method according to the present invention, in the holding step, the porous complex crystal is held in a narrowed part inside the through-hole.

(25) Further, it is a feature that in the soaking method according to the present invention, a tip part of the through-hole is formed in a reverse taper shape, and in the holding step, the porous complex crystal is moved toward the narrowed part at a boundary with the reverse taper shape from the opening on a side of the reverse taper shape of the through-hole, and is held by the narrowed part.

(26) Further, it is a feature that in the soaking method according to the present invention, a tip part of the through-hole is formed in a taper shape, and in the holding step, the porous complex crystal is moved toward the narrowed part at a part of the taper shape from the opening on a side opposed to a side of the taper shape of the through-hole, and is held by the narrowed part.

(27) Further, it is a feature that as to the soaking method according to the present invention, in the introduction step, the sample is introduced toward a direction where the porous complex crystal is moved.

Effect of the Invention

According to a sample holder for a single-crystal X-ray structure analysis apparatus of the present invention and a sample holder unit therefor as described above, an operation of soaking a sample in a fragile crystalline sponge in the single-crystal X-ray structure analysis apparatus, successive an operation of attaching it to a goniometer tip can be quickly, precisely and easily carried out without accompanying conventionally elaborate operations, and thus single-crystal X-ray structure analysis with a crystalline sponge can be quickly, precisely and easily carried out. Thus, it becomes possible to use the single-crystal X-ray structure analysis with the crystalline sponge easily, and to spread it widely.

DETAILED DESCRIPTION OF EMBODIMENTS

Next, the sample holder and the sample holder unit that are used in the single-crystal X-ray structure analysis apparatus in which a crystalline sponge is utilized, according to one embodiment of the present invention, are described in detail referring to the attached drawings. In addition, the expression of "A or B" in the present application means "at least one of A and B", and includes "A and B" unless there are exceptional circumstances where no possibility of A and B exists.

Figure 1:
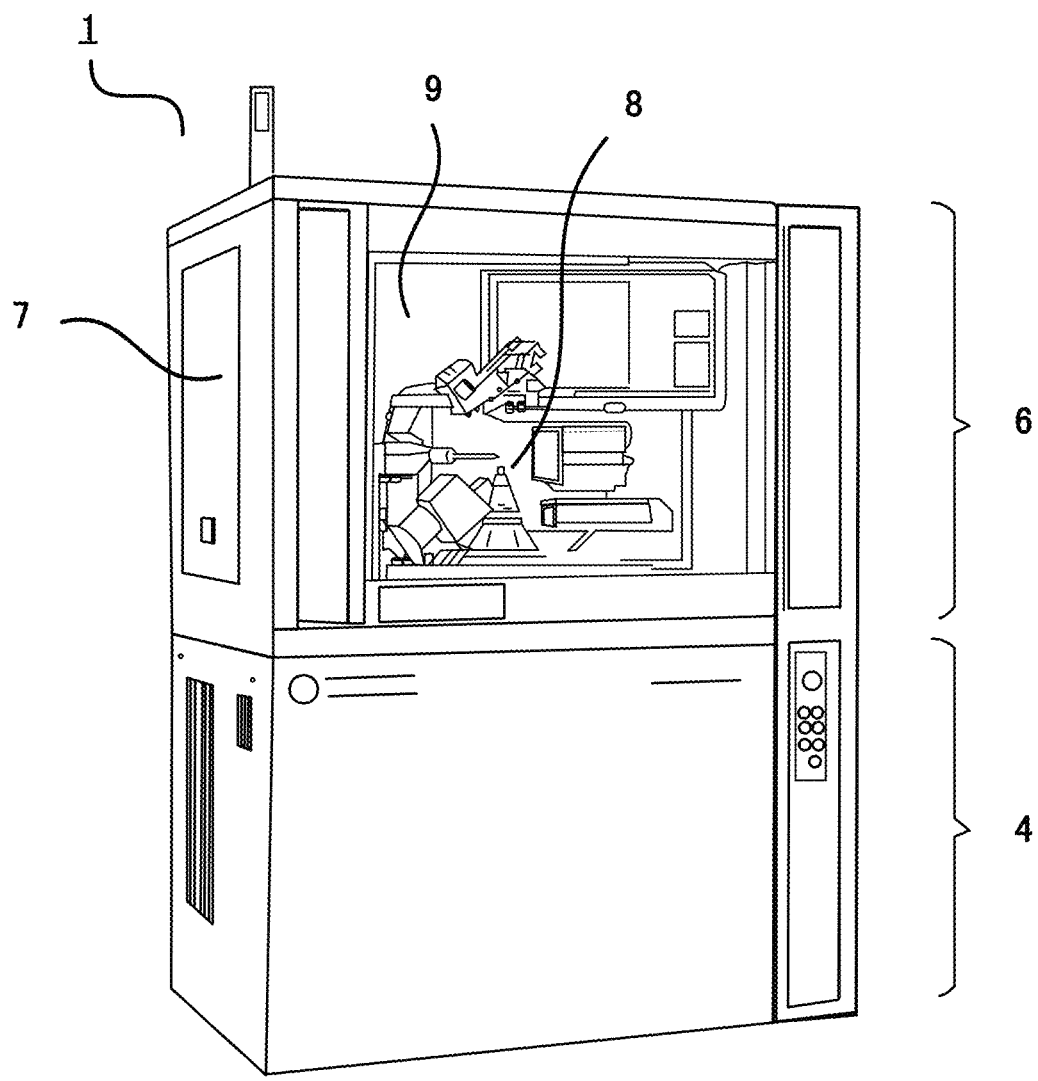
FIG. 1 is a diagram showing a whole configuration of a single-crystal X-ray structure analysis apparatus provided with a single-crystal X-ray diffractometer according to one embodiment of the present invention.

The attached FIG. 1 shows the entire appearance configuration of a single-crystal X-ray structure analysis apparatus provided with a single-crystal X-ray diffractometer according to one embodiment of the present invention, and as is clear from the figure, the single-crystal X-ray structure analysis apparatus 1 comprises a base stand 4 in which a cooling device and an X-ray generation power supply unit are stored, and an X-ray protection cover 6 placed on the base stand 4.

The X-ray protection cover 6 is provided with a casing 7 surrounding the single-crystal X-ray diffractometer 9, a door 8 provided in front of the casing 7, and so forth. The door 8 provided in front of the casing 7 is openable, and in this opened state, various operations can be performed for the internal single-crystal X-ray diffractometer 9. In addition, the present embodiment as shown in the figure is directed to the single-crystal X-ray structure analysis apparatus 1 provided with the single-crystal X-ray diffractometer 9 for performing a structure analysis of a material using the crystalline sponge mentioned below.

Figure 2:
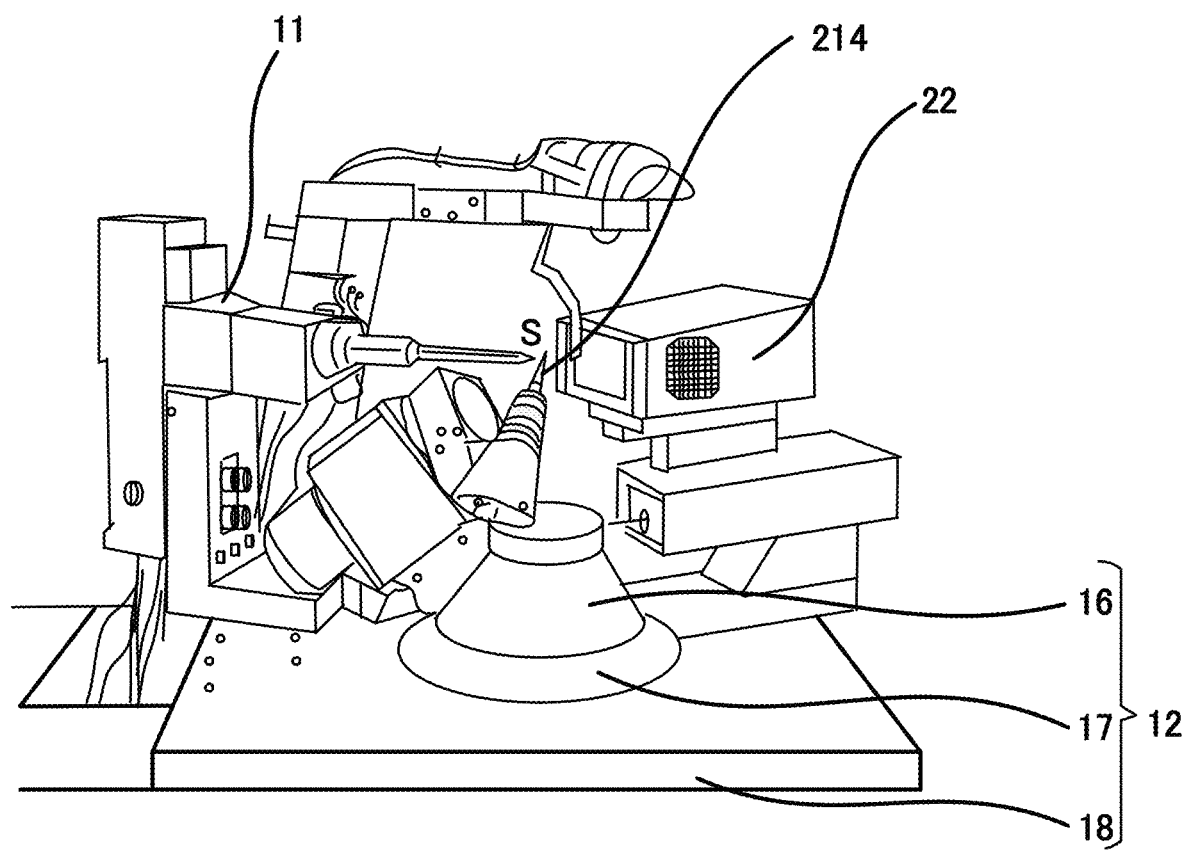
FIG. 2 is a diagram showing a configuration of the above-described single-crystal X-ray diffractometer.

The single-crystal X-ray diffractometer 9 comprises an X-ray tube 11 and a goniometer 12, as shown in FIG. 2 as well. The X-ray tube 11 comprises a filament, a target (referred to also as "anticathode") arranged so as to be opposed to the filament, and a casing for airtightly storing them, though not shown in the figure herein. This filament subjected to current applied by the X-ray generation power supply unit stored in the base stand 4 of FIG. 1 generates heat to emit thermo electrons. Further, a high voltage is applied between the filament and the target by the X-ray generation power supply unit, and the thermal electrons emitted from the filament are accelerated by the high voltage, and collide with the target. This collision area forms an X-ray focus, and X-rays are generated from the X-ray focus, and are spread out. In more detail, though not shown in the figure herein, the X-ray tube 11 comprising a microfocus tube and an optical element such as a multilayer focusing mirror or the like enables irradiation with higher brightness beam, and can also be selected from a radiation source such as Cu, Mo, Ag or the like. As exemplified above, the filament, the target arranged so as to be opposed to the filament, and the casing for airtightly storing them serve as an X-ray source, and a configuration for X-ray irradiation comprising the microfocus tube and the optical element such as the multilayer focusing mirror or the like serves as an X-ray irradiation section.

Further, the goniometer 12 supporting a sample S to be analyzed comprises a θ rotation table 16 that is rotatable centering a sample axis line w passing through an X-ray incident point of the sample S, and a 2θ rotation table 17 that is arranged around the θ rotation table 16 and is rotatable centering the sample axis line w. In addition, according to the present embodiment, the sample S is soaked inside a crystalline sponge previously attached to a part of the sample holder 214 mentioned below. Driving devices (not shown in the figure) for driving the above-described θ rotation table 16 and 20 rotation table 17 are stored inside a base 18 of the goniometer 12, and the θ rotation table 16 is driven by these driving devices to intermittently or continuously rotate at a predetermined angular speed so as to make a so-called θ rotation. Further, the 2θ rotation table 17 is driven by these driving devices to intermittently or continuously rotate so as to make a so-called 2θ rotation. The above-described driving devices can be constituted from any structure, and for example, can be constituted from a power transmission structure comprising a worm and a worm wheel.

An X-ray detector 22 is placed on a part of the outer periphery of the goniometer 12, and the X-ray detector 22 is constituted from for example, CCD type or CMOS type two-dimensional pixel detectors, a hybrid type pixel detector, or the like. In addition, an X-ray detection measurement section means a configuration in which X-rays diffracted or scattered by the sample are detected and measured, and comprises the X-ray detector 22 and a control section that controls the same.

The single-crystal X-ray diffractometer 9 is constituted as described above, and thus the sample S is θ-rotated centering the sample axis line w by the θ rotation of the θ rotation table 16 in the goniometer 12. During the θ rotation of this sample S, X-rays generated from the X-ray focus inside the X-ray tube 11 and is directed to the sample S enter the sample S at a predetermined angle, and are diffracted/scattered. That is, the incident angle of X-rays entering the sample S changes depending on the θ rotation of the sample S.

When the Bragg diffraction condition between an incident angle of X-rays entering the sample S and a crystal lattice plane is satisfied, diffraction X-rays are generated from the sample S. The diffraction X-rays are received by the X-ray detector 22 to measure an X-ray intensity thereof. From those described above, an angle of the X-ray detector 22 with respect to the incident X-rays, that is, an intensity of the diffraction X-rays corresponding to a diffraction angle is measured, and a crystal structure concerning the sample S and so forth are analyzed from this measurement result.

Figure 3A:
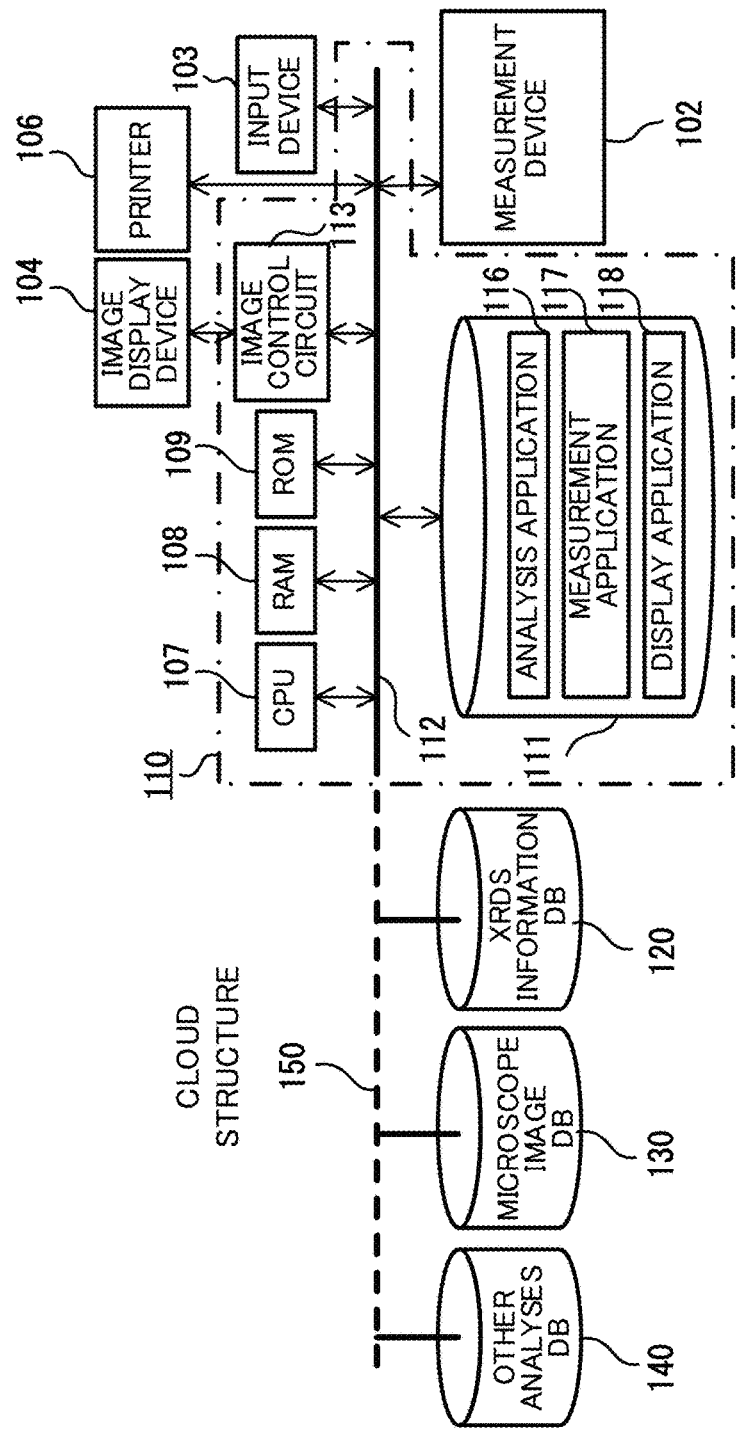
FIG. 3A is a block diagram showing an electrical configuration inside the above-described single-crystal X-ray structure analysis apparatus.

Then, FIG. 3A shows one example of the detail of an electrical internal configuration constituting a control section 110 in the above-described single-crystal X-ray structure analysis apparatus. In addition, as a matter of course, the present invention is not limited to the following embodiments according to the present invention.

This single-crystal X-ray structure analysis apparatus 1 includes the above-described internal configuration and further comprises a measurement device 102 for measuring a suitable material used as a sample; an input device 103 constituted from a keyboard, a mouse and so forth; an image display device 104 as display means; a printer 106 as means for printing and outputting the analysis result; CPU (Central Processing Unit) 107; RAM (Random Access Memory) 108; ROM (Read Only Memory) 109; a hard disk 111 as an external storage medium, and so forth. These elements are electrically connected mutually by a bus 112.

The image display device 104 constituted from an image display unit such as a CRT display, a liquid-crystal display or the like displays an image on a screen in accordance with an image signal generated by an image control circuit 113. The image control circuit 113 generates the image signal based on image data input therein. The image data input in the image control circuit 113 is generated by an operation of various calculation means achieved by a computer comprising CPU 107, RAM 108, ROM 109, and the hard disk 111. An inkjet plotter, a dot printer, an inkjet printer, an electrostatic transfer printer, or any other printing unit having arbitrary structure can be used for the printer 106. In addition, the hard disk 111 can also be constituted from a magneto-optical disk, a semiconductor memory, or any other storage medium having arbitrary structure.

Analysis application software 116 for managing the overall operation of the single-crystal X-ray structure analysis apparatus 1, measurement application software 117 for managing the operation of the measurement processing using the measurement device 102, and display application software 118 for managing the operation of the display processing using the image display device 104 are stored inside the hard disk 111. A predetermined function is achieved after reading out these pieces of application software from the hard disk 111, as needed, to transfer them to RAM 108.

This single-crystal X-ray structure analysis apparatus 1 further comprises for example, a database placed in a cloud area, the database for storing various measurement results including measurement data obtained by the above-described measurement device 102. Referring to an example of the figure, as is explained below, shown are an XRDS information database 120 that stores XRDS image data obtained by the above-described measurement device 102, and a microscope image database 130 that stores actually observed images obtained by the microscope, and further shown are for example, measurement results obtained via analysis performed with not X-rays but XRF, Raman ray or the like, and the other analysis database 140 that stores physical property information. In addition, these databases are not necessarily stored inside the single-crystal X-ray structure analysis apparatus 1, and for example, they may be provided outside and be connected to be able to communicate mutually via a network 150 or the like.

Figure 3B:
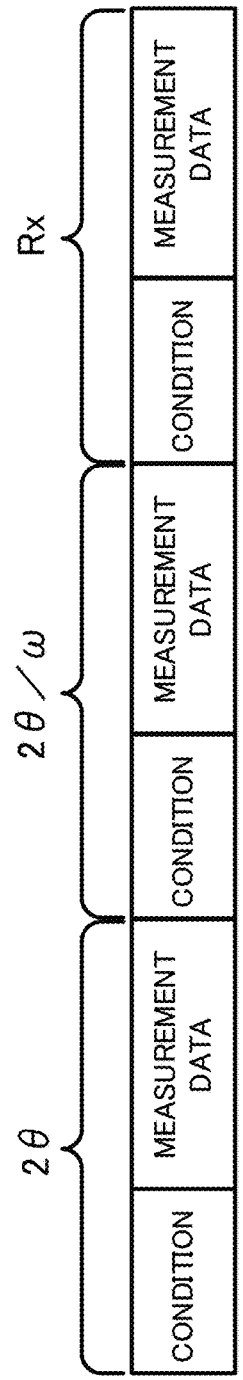
FIG. 3B is a configuration inside the data file.

A method of storing individual measurement data inside an individual file is also taken into account as a file management method for storing a plurality of measurement data inside a data file, but according to the present embodiment, as shown in FIG. 3B, the plurality of measurement data are set to be continuously stored inside one data file. In addition, referring to FIG. 3B, storage areas each in which "condition" is written are an area for storing every kind of information including device information and measurement conditions when obtaining measurement data.

As such measurement conditions, (1) name of measurement object material, (2) type of measurement device, (3) measurement temperature range, (4) measurement start time, (5) measurement end time, (6) measurement angle range, (7) moving speed in scanning movement system, (8) scanning condition, (9) type of X-rays incident on sample, (10) whether or not to use attachments such as a sample high-temperature device, and so forth are conceivable, and various other conditions are also conceivable.

Figure 4:
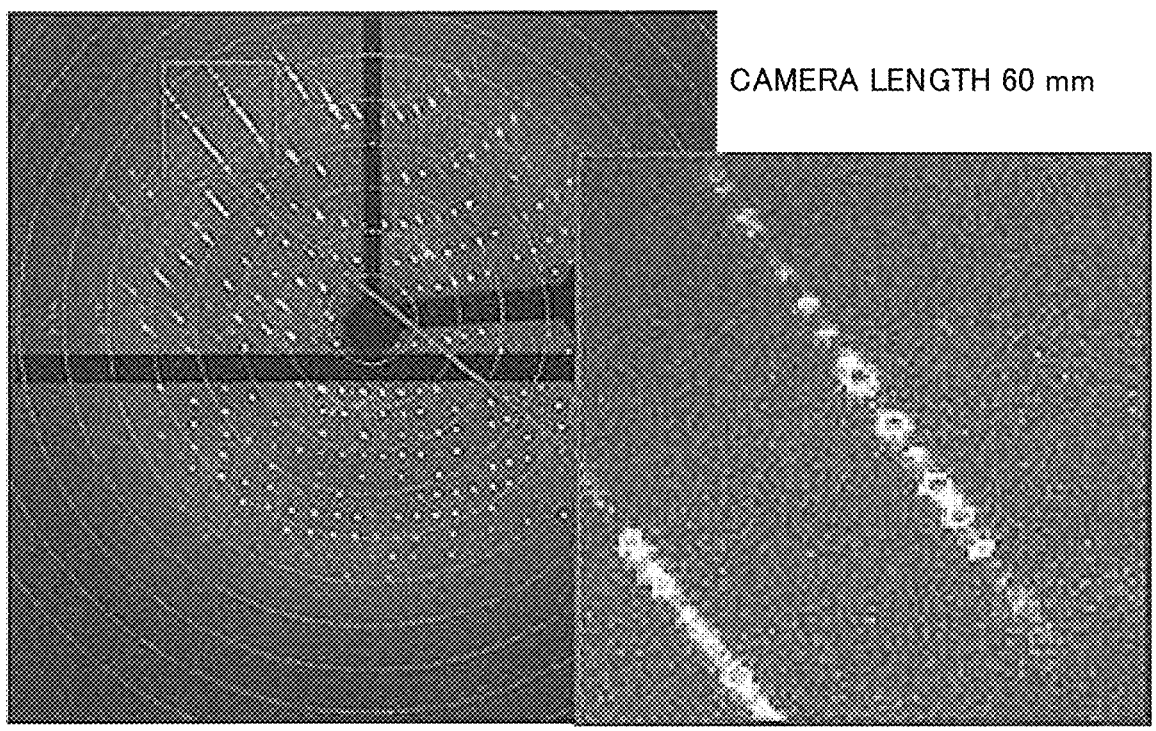
FIG. 4 is a diagram including a photograph showing an XRDS pattern or an image obtained by the analysis apparatus.

An XRDS (X-ray Diffraction and Scattering) pattern or an image (Refer to FIG. 4) is obtained by receiving/accumulating X-rays received on a flat plane that is a two-dimensional space of the X-ray detector 22 constituting the above-described measurement device 102 for each pixel arranged in planar array, that constitutes the detector, and by measuring an intensity thereof. For example, a pattern or an image on a two-dimensional space of r and θ can be obtained by detecting the intensity of X-rays received via an integral, for each pixel of the X-ray detector 22.

<Measurement Application Software>

The XRDS pattern or the image on an observation space, that is obtained by diffraction or scattering of X-rays caused by an object material for irradiation of the X-rays reflects information of an electron density distribution in an actual space of the object material. However, the XRDS pattern on the two-dimensional space of r and θ does not directly represents symmetry in the actual space of the object material as a three-dimensional space. Accordingly, it is generally difficult to specify the (spatial) arrangement of atoms and molecules that constitute the material with only the existing XRDS image, and thus a specialized knowledge of X-ray structure analysis is required. Therefore, according to the present Example, automatization is achieved by adopting the above-described measurement application software.

Figure 5A:
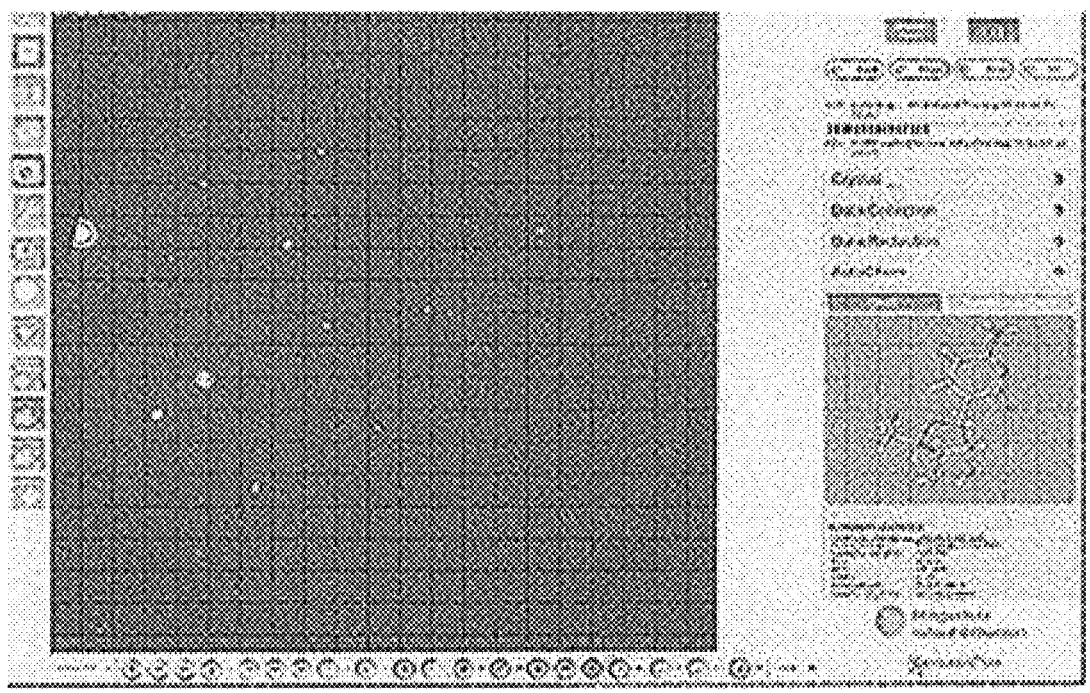
FIG. 5A(5B) is a diagram including a photograph showing one example of a screen obtained by executing X-ray diffraction data measurement/processing software on the above-described single-crystal X-ray structure analysis apparatus.
Figure 5B:
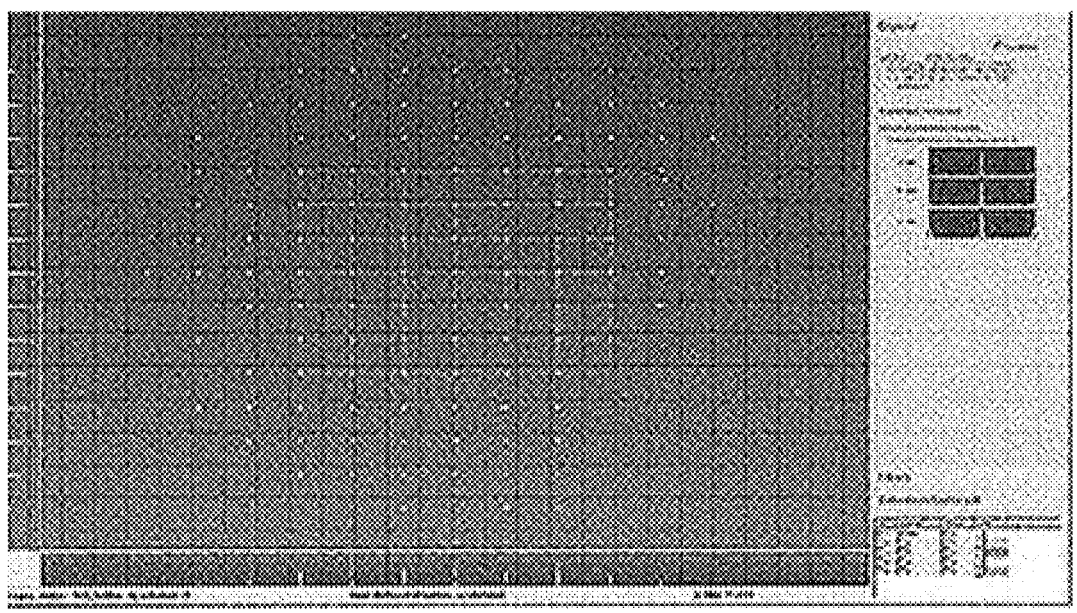
Figure 6:
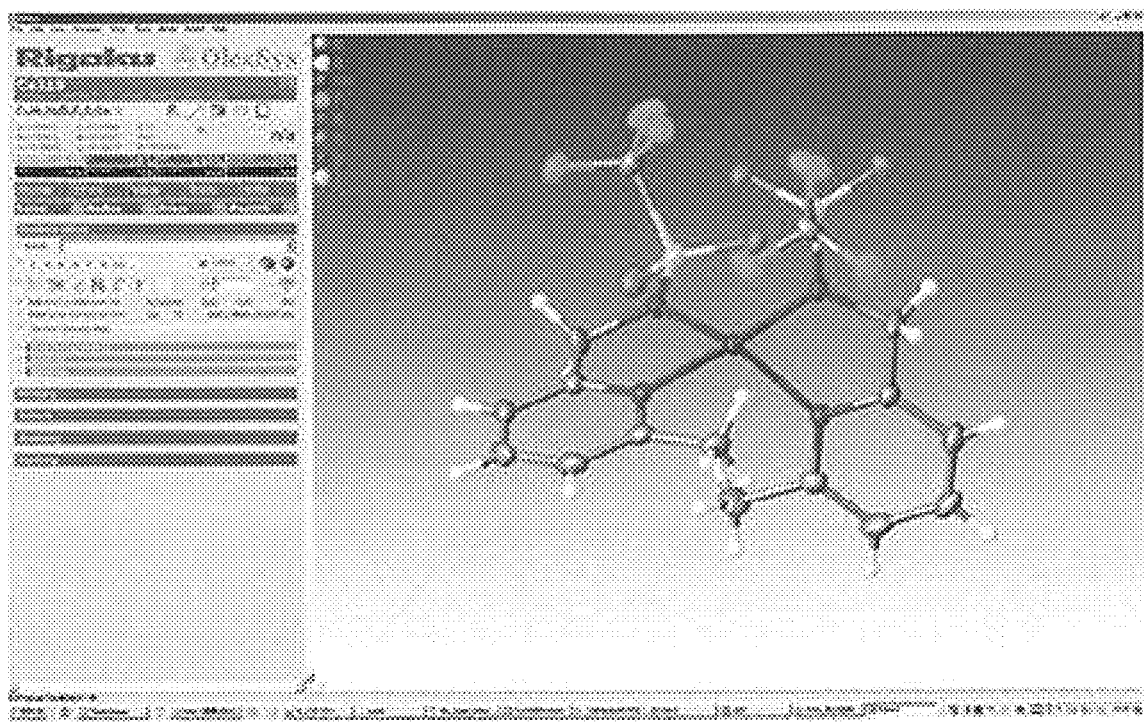
FIG. 6 is a diagram including a screen showing a molecular model prepared using a structure analysis program of the above-described single-crystal X-ray structure analysis apparatus.

For one example, as shown in the execution screens of FIGS. 5A and 5B, X-ray diffraction data measurement/processing software called "CrysAlis$^{Pro}$" that is a platform for single-crystal structure analysis is installed to execute preliminary measurement, setting of measurement conditions, main measurement, data processing and so forth. Further, structure analysis and structure refinement are executed in parallel with X-ray diffraction data collection by installing an automatic structure analysis plug-in called "AutoChem". Then, from space group determination to phase determination, construction and correction of molecular modelling, structure refinement, final reporting, and preparation of a CIF file are executed by a structure analysis program called "Olex$^2$" as also shown in FIG. 6.

The whole structure and the function of the single-crystal X-ray structure analysis apparatus 1 are described above, and a crystalline sponge according to the present invention, and devices and tools related thereto are specifically described below in detail, referring to the attached drawings.

<Crystalline Sponge>

As described above, the single-crystal X-ray structure analysis has become widely applicable for those including a liquid compound that cannot be crystallized, a very small amount of a sample having an amount of several ng to several μg that is incapable of acquiring a sufficient amount to perform crystallization, or the like via development of a material called "crystalline sponge" that is a very small and fragile porous complex crystal having an approximate size of several 10 μm to several 100 μm, in whose inside countless pores each having a diameter of 0.5 to 1 nm are formed.

However, in the current situation, in order to perform soaking (post-crystallization) that is crystallization of a sample into a framework of the above-described crystalline sponge, as previously described, a step of soaking a very small amount of a sample, approximately several ng to several μg, separated by various pretreatment (separation) devices in a framework of a very small and fragile crystalline sponge having an outer diameter of approximately 100 μm provided via immersion in a preserving solvent such as cyclohexane or the like, inside a container, is required. Subsequently, a step of taking out, from a container, a very small, fragile and difficultly handleable crystalline sponge quickly (in a short period of time in such an extent that the crystalline sponge is not broken due to drying), and accurately attaching it to an X-ray irradiation position inside a single-crystal X-ray diffractometer, more specifically, to a tip of a sample axis of the goniometer 12 (so-called goniometer head pin) while performing centering is further required. These steps are not only fine operations for which high preciseness is required but also those for which rapidness is required for the operator, regardless of presence/absence of a specialized knowledge of X-ray structure analysis, thereby resulting in having a large influence on the measurement result of a sample after being soaked in the crystalline sponge. That is, these operations make single-crystal X-ray structure analysis using a very small crystalline sponge result in low yield, and thus this becomes one of the causes of suppressing the single-crystal X-ray structure analysis using the crystalline sponge from being widely used.

<Sample Holder and Sample Holder Unit>

The present invention that has been accomplished based on the above-described inventor's knowledge enables quickly, surely and easily performing a single-crystal X-ray structure analysis with a very small and fragile crystalline sponge by using a sample holder for the crystalline sponge (also referred to simply as a sample holder) as described below, in other words, achieves a high-yield, efficient, very versatile and user-friendly single-crystal X-ray structure analysis apparatus. That is, as to the next-generation single-crystal X-ray structure analysis apparatus according to the present invention, there is a large constraint that the very small and fragile crystalline sponge in which a very small amount of a sample S is soaked is prepared, and further the sample S (crystalline sponge) needs to be taken up from a soaking container and precisely and quickly attached to a predetermined position at the tip of the goniometer 12 in a short and quick period of time in such an extent that the crystalline sponge is not broken due to drying, but specifically in order to achieve the very versatile and user-friendly apparatus, such operations need to be made quickly and easily executable without requiring highly specialized knowledge as well as operation preciseness.

The present invention described below in detail resolves such a problem, that is, provides a sample holder for a single-crystal X-ray structure analysis apparatus as a tool for enabling performing an operation of soaking a sample in the crystalline sponge, followed by an operation including attaching it to an apparatus in a high-yield efficient, very versatile and user-friendly manner, by anyone while also using a very small, fragile and difficultly handleable crystalline sponge, and for making it possible to realize the single-crystal X-ray structure analysis apparatus; and provides a sample holder unit therefor.

Figure 7A:
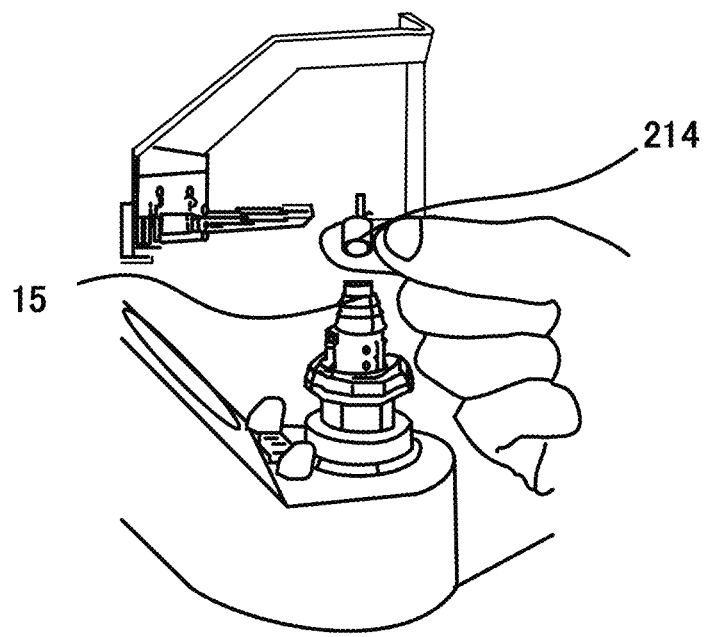
FIG. 7A is a diagram including a photograph showing one example of a structure centering on a goniometer of the above-described single-crystal X-ray diffractometer.
Figure 7B:
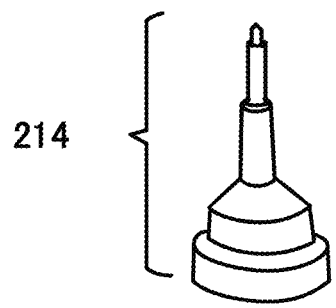
FIG. 7B is a diagram showing the sample holder.

FIG. 7A shows a tip of the goniometer 12 in an enlarged view, and this figure shows a state that, the sample holder 214, being in an enlarged view as FIG. 7B, as a tool where the crystalline sponge 200 soaking a sample to be analyzed that is proposed according to the present invention is attached (mounted) to the goniometer head 15 as a tip of the goniometer 12 in advance. In addition, the sample holder 214, for example, can be attached/detached to/from the goniometer head 15 as the tip of the goniometer 12 by an attaching/positioning mechanism for which magnetic force or the like is used, and can be attached easily and accurately at an exact position by anyone.

Example 1

Figure 8:
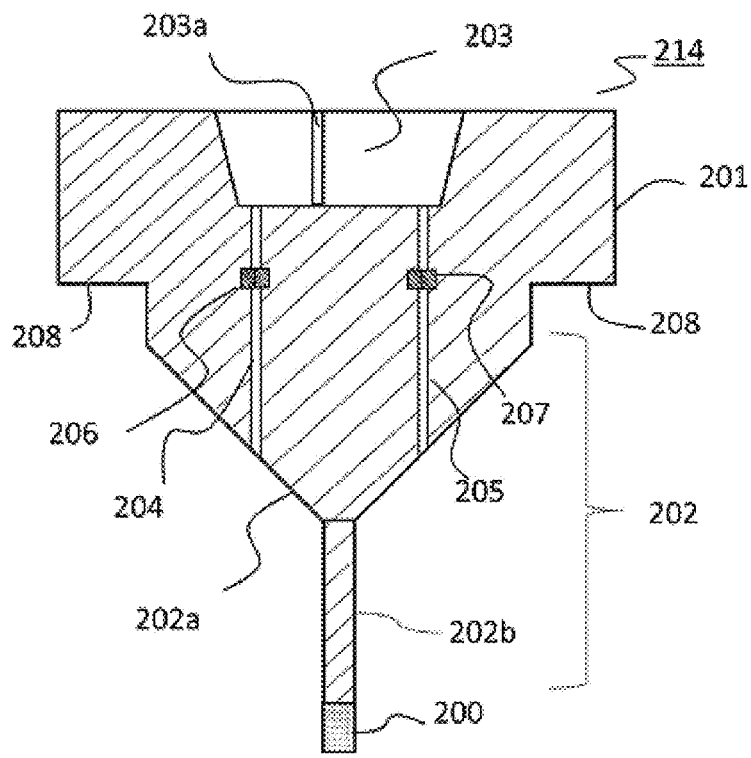
FIG. 8 is a sectional view showing one example of a sample holder to be attached to the above-described goniometer of Example 1 according to the present invention.

FIG. 8 shows a sectional view of the sample holder 214 according to Example 1. The sample holder 214 comprises a disk-shaped base part 201 made of metal or the like, to be attached to the goniometer head 15 (Refer to FIG. 7A) at the tip of the goniometer 12, and a protrusion part 202 formed in a protrusion shape extending downward from one surface of the disk-shaped base part 201 (the lower surface in the figure). The protrusion part 202 comprises s conical part 202a, and a sample holding part (corresponding to the so-called goniometer head pin) 202b formed in a protrusion shape. The crystalline sponge 200 in which the above-described sample to be analyzed is soaked is combinedly attached to the sample holder 214 beforehand at a predetermined position of the tip of the sample holding part 202b.

Further, an attachment part 203 in a recessed truncated cone shape is formed on the other surface (upper surface in the figure) of the base part 201, and a magnet that is not shown in the figure or a projected engagement part (or recessed part) 203a is provided on a contact surface with the goniometer head 15 at the tip of the foregoing goniometer 12 in this attachment part 203. By having this mechanism, the sample holder 214 can be attached/detached to/from the goniometer head 15 at the tip of the goniometer 12, and can be easily and accurately attached thereto by anyone.

The outer diameter on the base part side of the conical part 202a of the sample holder 214 is set to be smaller than the outer diameter of the base part 201, and an annular-shaped step part 208 is formed. Further, through-holes 204 and 205 passing from the base part 201 to the protrusion part 202 are formed as a sample introduction structure, and seal parts 206 and 207 for airtightly sealing a hole interior are provided in respective through-holes 204 and 205.

Figure 9:
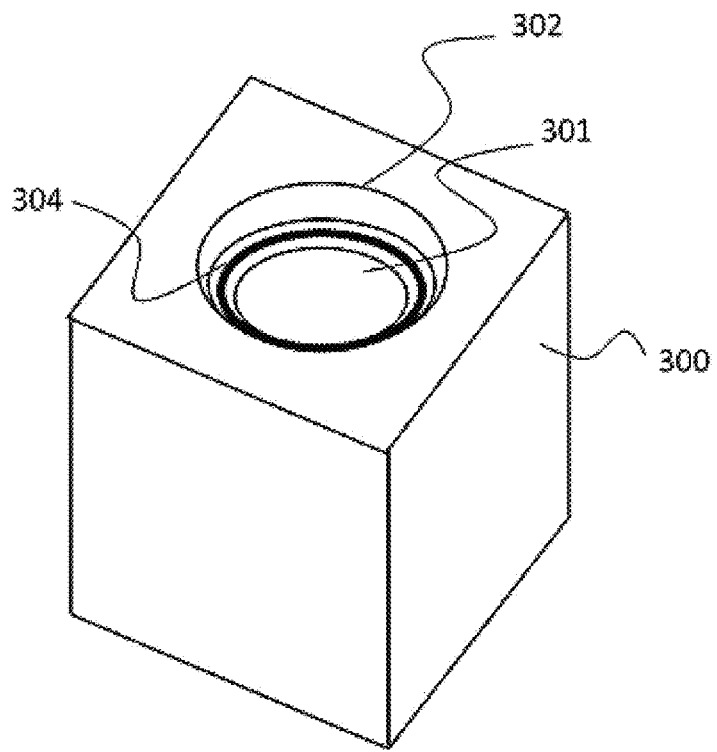
FIG. 9 is a perspective view of an applicator for storing the above-described sample holder.
Figure 10:
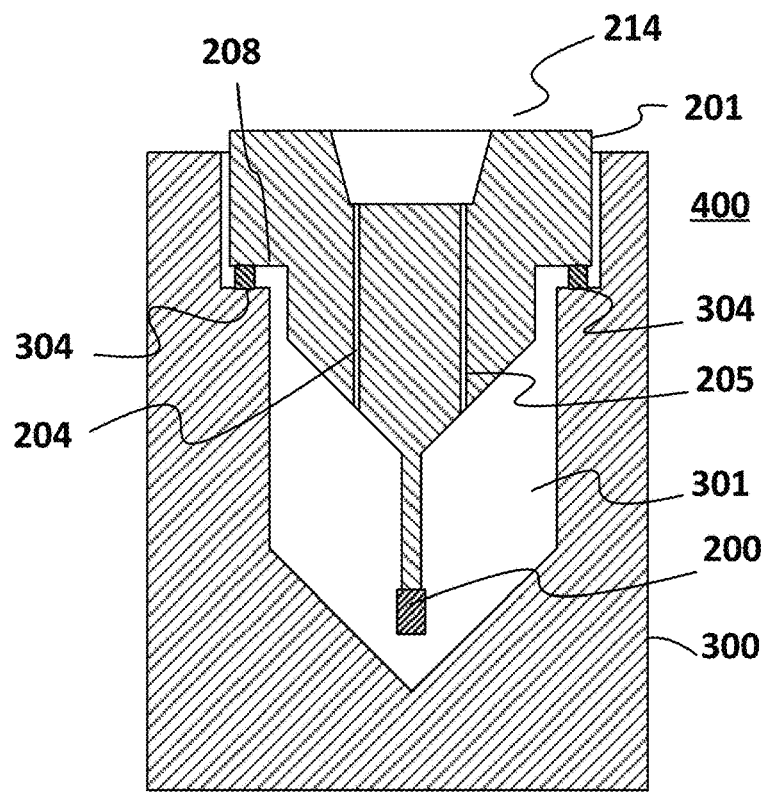
FIG. 10 is an explanatory diagram showing sample holder unit in a state where the above-described sample holder is stored in an applicator.

FIG. 9 shows a perspective view of an applicator 300 to be a tool for storing the sample holder 214, and soaking a sample in a crystalline sponge 200, that is attached beforehand to the sample holder 214. FIG. 10 is a sectional diagram of a sample holder unit 400 comprising an applicator 300, and a sample holder 214 stored inside it.

The applicator 300 is formed of, for example, a transparent or opaque member such as glass, a resin, metal or the like, where a storing space 301 for storing the sample holder 214 is formed inside, and further the sample holder 214 is fitted in and an opening 302 for taking it out is formed at the upper portion. On an annular bottom surface of the opening 302, for example, an annular seal part (O-ring) 304 is provided, and during storing of the sample holder 214, the step part 208 of the sample holder 214 comes into contact with the seal part 304 to maintain the airtightness between the sample holder 214 and the applicator 300.

Figure 11:
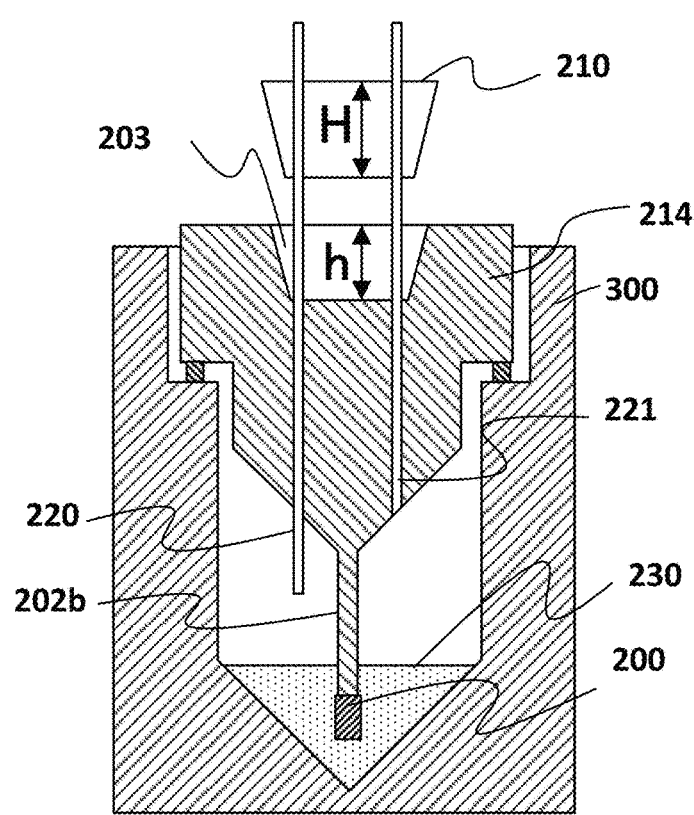
FIG. 11 is an explanatory diagram process of inserting a sample introduction pipe in the above-described sample holder.
Figure 12:
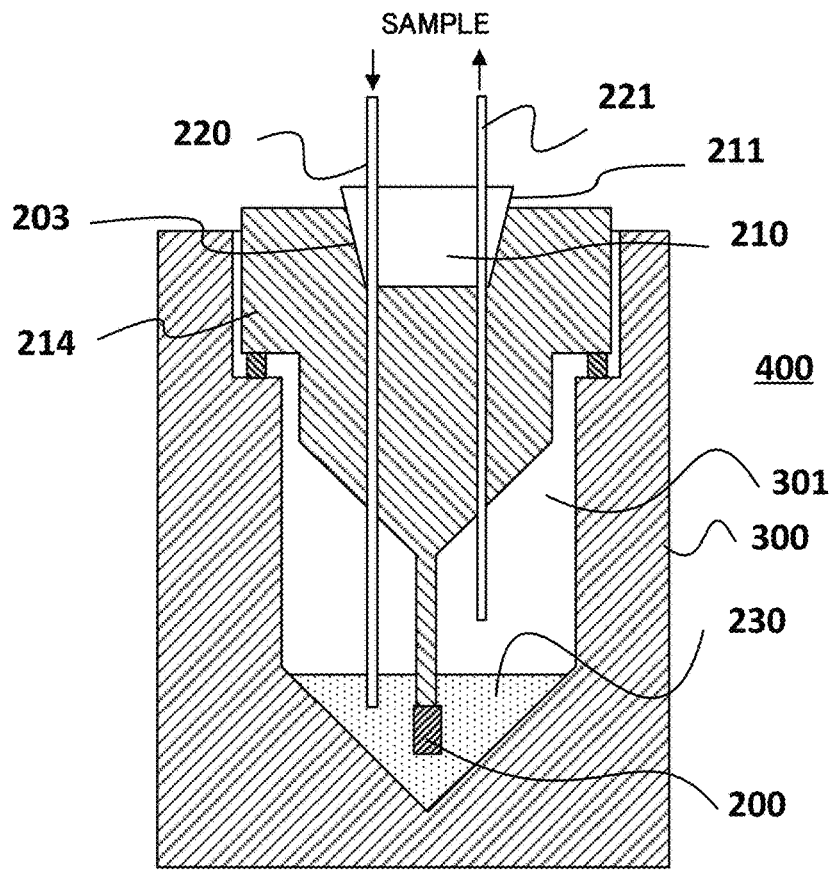
FIG. 12 is an explanatory diagram showing process of soaking a sample introduced similarly from the sample introduction pipe in crystalline sponge.

FIG. 11 is an explanatory diagram showing a process of inserting sample introduction pipes (hereinafter, also referred to simply as pipes) 220 and 221 as a sample introduction structure in through-holes 204 and 205 (Refer to FIG. 8) of the sample holder, and FIG. 12 is an explanatory diagram of a state where the above-described pipes are inserted. The pipes 220 and 221 each are airtightly maintained between the through-holes 204 and 205 by the seal parts % and 207 (Refer to FIG. 8). Symbol 210 representing a support part for supporting the sample introduction pipes 220 and 221 supports both pipes in a state of being approximately parallel to each other at an interval equal to the interval between the through-holes 204 and 205. A support part 210 whose height H is set be higher than height h of the attachment part 203 in the sample holder 21 has approximately the same shape as that of the attachment part 203 formed into a recessed shape, as being truncated cone-shaped.

The sample introduction pipes 220 and 221 are simultaneously inserted in the through-holes 204 and 205 by pushing down the support part 210 with fingers, a manipulator or the like. The support part 210 whose lower end enters a recessed part of the attachment part 203, and comes into contact with the bottom surface of the recessed part, followed by lowering and stopping to stably support the pipes 220 and 221.

As shown in FIG. 12, the support part 210 protrudes upward (Refer to symbol 211) by a difference of height H and height h from the attachment part 203 in a stopped state. This projected portion 211 is useful as a tool when pulling out the pipes 220 and 221, after soaking a sample in the crystalline sponge 200. That is, the pipes 220 and 221 can be efficiently pulled out at the same time by holding the projected portion 211 of the support portion 210 therebetween with fingers, a manipulator or the like to pull them up.

In FIGS. 11 and 12, symbol 230 represents a hydrophobic solvent (for example cyclohexane) injected at the bottom part of the storing space 301 in the applicator 300, and setting is made to a level at which the crystalline sponge 200 at the tip part of the sample holding part 202b is immersed to fill it therewith. The pipe 220 is a sample injection pipe, and the pipe 221 is a discharge pipe. The tip of the pipe 220 extending to the vicinity of the crystalline sponge 200 is dipped in the solvent 230, and the tip of the pipe 221 extends to a position of not being immersed in the solvent 230.

In FIG. 12, when a sample (for example, gas) to be measured is injected from the injection pipe 220, the sample is penetrated in the solvent 230, and soaked into the crystalline sponge 200 inside the solvent. The excessively supplied sample (a solvent, a carrier or the like) is discharged to the outside through the pipe 221.

Thereafter, in the present example, the pipes 220 and 221 are pulled out at the same time by holding the projected portion 211 of the support portion 210 therebetween with fingers, a manipulator or the like to pull them up, and the sample holder 214 comprising the crystalline sponge 200 in which the sample is soaked is subsequently attached to the goniometer head 15 at the tip of the goniometer 12. In addition, the sample holder 214 and the applicator 300 that is a tool to handle therefor are used together in combination as a sample holder unit 400, and the required number of them for an analysis operation are prepared and stored in a box-shaped container, that is, also possible to be provided as a set.

According to the sample holder unit 400 with such a configuration, the crystalline sponge 200 attached to the tip of the pin-shaped holding part 202b (corresponding to a goniometer head pin) constituting a part of the sample holder 214 can be safely and easily handled without damage, or without deviation from the sample holder 214. That is, the crystalline sponge 200 in which a very small amount of the sample is soaked can be safely, simply and easily prepared on the goniometer head 15 in a short and quick period of time in such an extent that no damage occurs due to drying, without any damage due to taking singly it out from a soaking container unlike a conventional manner. According to the present Example, the sample holder 214 with which soaking of the sample is completed is removed from the applicator 300, and is attached to the goniometer head 15 (Refer to FIG. 7A) at the tip portion of the goniometer 12. In this manner, the sample S soaked in the crystalline sponge 200 is easily, precisely and quickly arranged at a predetermined position inside the single-crystal X-ray diffractometer 9 without requiring highly specialized knowledge and precise operations.

<Introduction of Sample by Soaking Apparatus (Soaking Machine)>

Next, soaking a sample in the crystalline sponge 200 inside the sample holder unit 400 (Refer to FIGS. 10 to 12) with the above-described configuration, that is performed using a soaking apparatus, is described.

Figure 13:
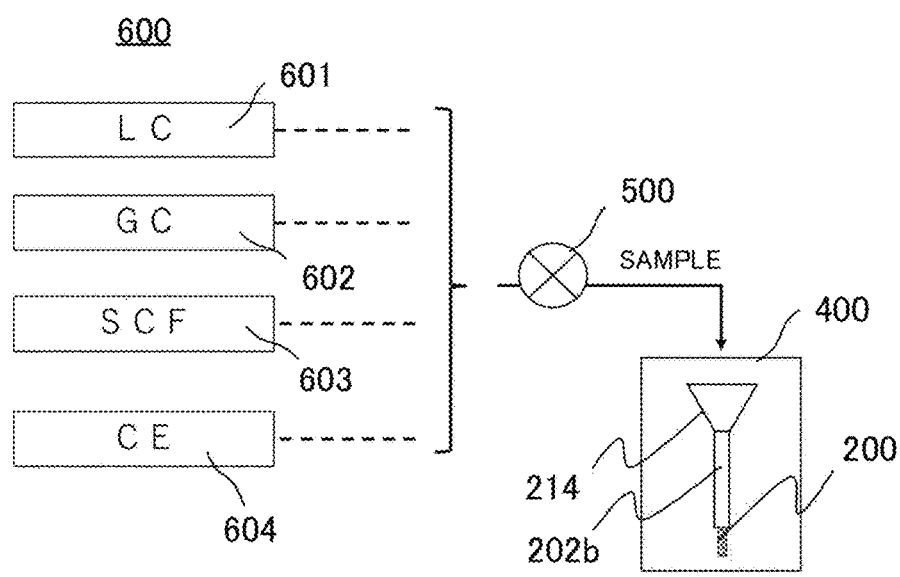
FIG. 13 is a diagram showing one example of a pretreatment apparatus used in single-crystal X-ray structure analysis.

In FIG. 13, a very small amount of the sample S extracted by LC (liquid chromatography) 601, GC (gas chromatography) 602, and further, SFC (supercritical fluid chromatography) 603, CE (capillary electrophoresis) 604 and so forth that constitute a pretreatment device 600 is supplied to a pair of the sample introduction pipes 220 and 221 to be inserted in the through-holes 204 and 205 of the sample holder 214 through the soaking apparatus (soaking machine) 500 provided with various switching valves and a pressure adjustment device, that supplies a fluid under the necessary conditions (flow rate and pressure), and the sample is selectively introduced into the storing space 301 inside the applicator 300. That is, the sample is sent to the sample introduction pipe 220 on the supply side from the supply side pipe, and is supplied to the sample holder 214 inside the applicator 300 from the tip portion of the sample introduction pipe 220 on the supply side. Only the sample, or a solution in which the sample and the preserving solvent are mixed is supplied by flowing inside the sample introduction pipe 220 on the supply side. In this manner, a very small amount of the sample S introduced thereinto comes into contact with the crystalline sponge 200 attached to the tip of the pin-shaped holding part 202b of the sample holder 214 inside the storing space 301 of the applicator 300, and the sample is soaked therein. In addition, examples of the electrophoresis device herein include various electrophoresis devices concerning capillary electrophoresis, isoelectric point electrophoresis, and so forth. In a state where the sample is injected, the excessive sample or a solution in which the sample and the preserving solvent are mixed is discharged from the sample introduction pipe 221 on the discharge side, after a predetermined time has elapsed. When not using the soaking device 500, the unnecessary preserving solvent or solution flows inside the sample introduction pipe 220 on the discharge side, and is discharged. Accordingly, it is possible that no sample flows through the sample instruction pipe 220 on the discharge side.

Then, the sample holder 214 with which the step of soaking is completed is removed from the applicator 300, and is precisely attached to a predetermined position inside the single-crystal X-ray diffractometer 9, that is, to the goniometer head 15 at the tip of the goniometer 12, for example, by using a positioning mechanism such as the above-described magnetic force or the like. According to the foregoing, the crystalline sponge 200 attached to a part (tip) of the pin-shaped holding part 202b of the sample holder 214 is to be arranged to the tip of the goniometer 12, that is, to a position where X-ray beam is focused and irradiated from the X-ray tube 11 after soaking the sample is completed. In other words, the sample S soaked in the crystalline sponge 200 is precisely arranged at a predetermined position inside the single-crystal X-ray diffractometer 9, and the intensity of X-rays diffracted from the sample S is subsequently measured by the X-ray detector 22 to analyze a crystal structure thereof, and so forth.

In this manner, by the sample holder 214 and the sample holder unit 400 according to the present invention, it becomes possible that a very small amount of sample is easily and safely soaked in the crystalline sponge 200 having very small size, that is combinedly attached beforehand to the sample holder 214, by anyone, and subsequently, the sample S is quickly and safely installed to the goniometer at a precise position with high accuracy in a short period of time in such an extent that the crystalline sponge is not broken due to drying. In addition, subsequently, it is identical to those in the current condition that X-rays diffracted and scattered by an object material are measured while irradiating X-rays having a required wavelength to the sample S by the above-described single-crystal X-ray diffractometer 9, and the structure analysis is performed by a measurement application software constituting the above-described single-crystal X-ray structure analysis apparatus to carry out construction of molecular modelling, preparation of a final report, and so forth. That is, the present Example brings quick, safe and easy check of the molecular structure/aggregative structure (actual space) of a newly discovered or designed structure at sites and so forth of not only drug development and life science but also every kind of material research.

Example 2

Figure 14:
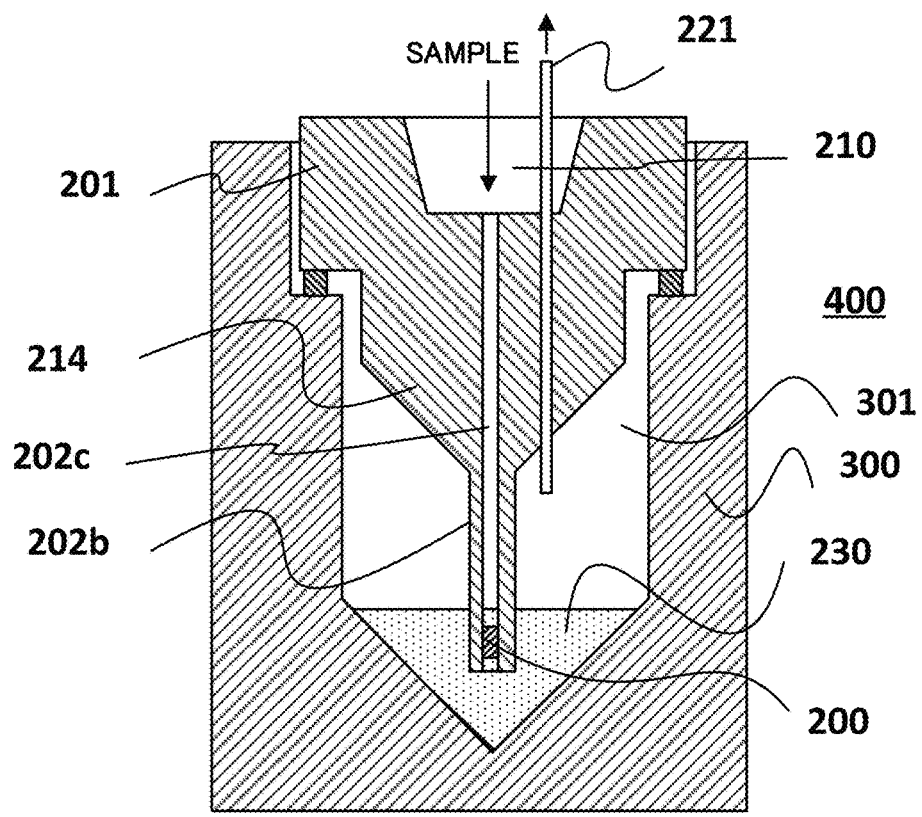
FIG. 14 is a sectional view of a sample holder unit of Example 2 according to the present invention.

FIG. 14 shows a cross-sectional structure of a sample holder unit 400 of Example 2. The through-hole 202c passing from the base part 201 to the tip part of the sample holding part 202b is provided as a sample introduction structure in the sample holder 214 inside this sample holder unit 400. Then, the crystalline sponge 200 is attached to the tip part or to the vicinity of the tip part inside the above-described through-hole 202c. In addition, the length of the sample holding part 202b is set in such a manner that the tip part is dipped in the solvent 230, and the crystalline sponge 200 is immersed in the solvent 230 entering the through-hole 202c. Then, when a sample (for example, gas) is introduced from the base part 201 side of the through-hole 202c, the sample is soaked in the crystalline sponge 200 through the solvent 230 inside the through-hole 202c.

Figure 15:
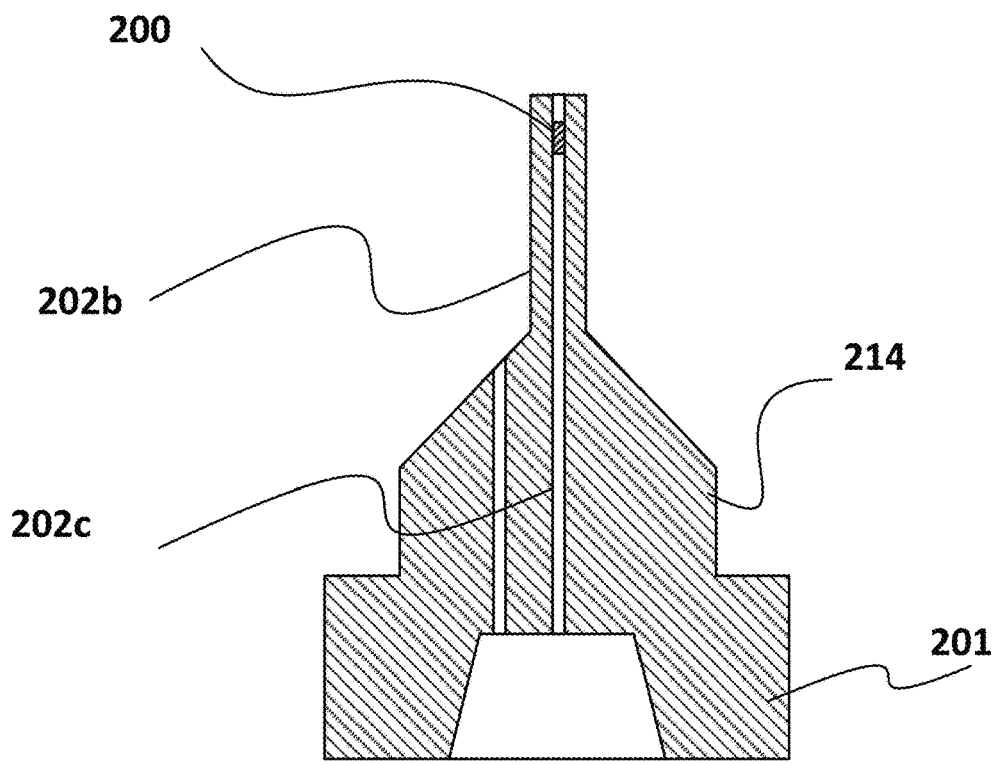
FIG. 15 is a sectional view of a posture of attaching a sample holder of Example 2 to a goniometer according to the same.

Next, the crystalline sponge 200 in which the sample is soaked, together with a sample holder 214 is removed from the applicator 300, and is attached to the goniometer head 15 at the tip of the goniometer 12, together with the sample holder 214 in the posture shown in FIG. 15. In this state, inside the single-crystal X-ray diffractometer 9, X-rays are irradiated to the crystalline sponge 200 from the X-ray tube 11. In this case, the crystalline sponge 200 is held in the sample holding part 202a, and thus X-rays passing through the wall of the sample holding part 202b enter the crystalline sponge 200 inside. In the present Example, for example, beam-translucent borosilicate glass, quartz glass and so forth, each of which does not hinder transmission of X-rays as much as possible are selectively used as materials for the sample holding part 202b in such a manner that X-rays to be irradiated therewith effectively reach the crystalline sponge 200 with little attenuation.

As described above, in the present Example 2, each of steps of soaking a sample in the crystalline sponge 200, being attached to the goniometer 12, and subsequent irradiating X-rays thereto is always performed in a state where the crystalline sponge 200 is held inside the through-hole 202c of the sample holding part 202b. Accordingly, a series of the steps are carried out very quickly without giving any damage to the crystalline sponge 200, and thus efficiency, safety, and sureness of operations thereof can be improved.

Example 3

Figure 16:
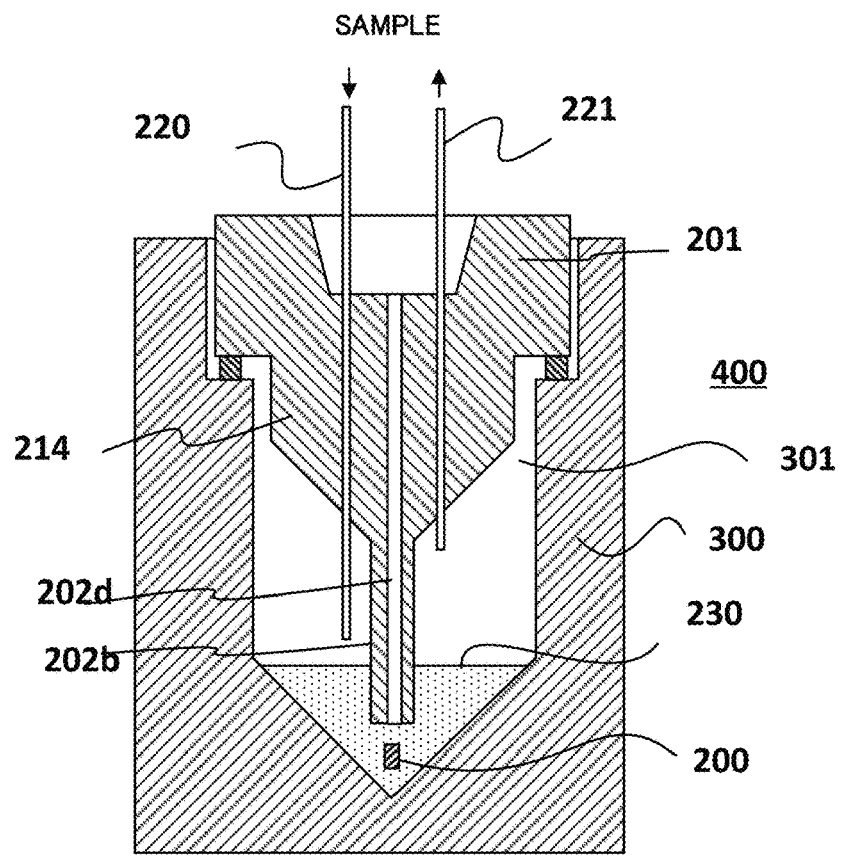
FIG. 16 is a sectional view of a sample holder unit of Example 3 according to the present invention.

FIG. 16 shows a cross-sectional structure of a sample holder unit 400 of Example 3. A sample holding area 202d formed from a through-hole passing from the base part 201 to the tip part of the sample holding part 202b is provided in the sample holder 214 of this sample holder unit 400. The tip part of the sample holding part 202b is dipped in the solvent 230, and the tip part of the sample holding area part 202d is arranged so as to be immersed in the solvent 230. In this example, the crystalline sponge 200 is arranged near the bottom of the storing space 301 of the applicator 300 so as to be dipped inside the solvent 230, before soaking the sample therein; and the tip part of the sample holding part 202b is arranged so as to approach the crystalline sponge 200 inside the solvent 230.

Figure 17:
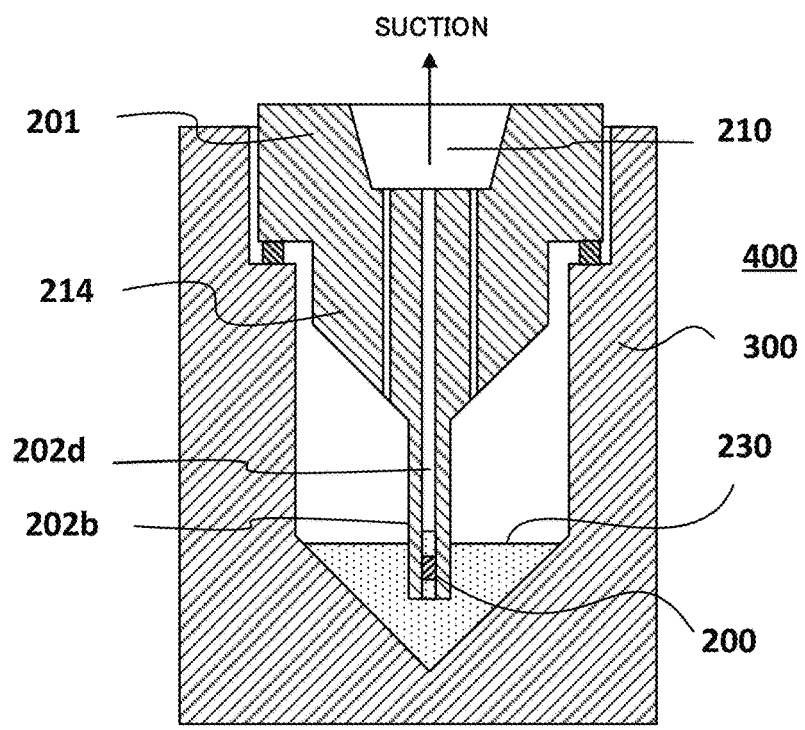
FIG. 17 is a sectional view in a suction process of the sample holder unit of Example 3 according to the same.

Next, when a sample (for example, gas) is injected from the sample introduction pipe 220, the sample is introduced into the solvent 230, and soaked in the crystalline sponge 200 inside the solvent. Then, as shown in FIG. 17, the crystalline sponge 200 in which the sample is soaked, together with the solvent is sucked from the upper of the sample holding area 202d (the base part 201 side). This suction is carried out by sucking gas inside the sample holding area 202d with a syringe or the like, and the suction amount is such an amount that the crystalline sponge 200 in which the sample is soaked is slightly sucked into the sample holding area 202d. By this suction, the crystalline sponge 200 together with the solvent 230 enters the sample holding area 202d near the tip part of the sample holding part 202b, and is held in a state where the solvent 230 adheres thereto.

In addition, according to the above-described method, the crystalline sponge 200 after soaking the sample S is sucked, but it is preferred that the crystalline sponge 200 is attached to the sample holder 214 in advance, and the sample is subsequently soaked therein. In this manner, there is no need of finding the crystalline sponge after soaking the sample S therein to introduce it thereinto. Further, the suction is merely one of the means for moving the crystalline sponge 200 into the sample holding area 202d from the outside of the sample holding area 202d, and various pieces of means such as a method of making the crystalline sponge 200 flow therethrough by utilizing gravity, and so forth, are adoptable.

Figure 18:
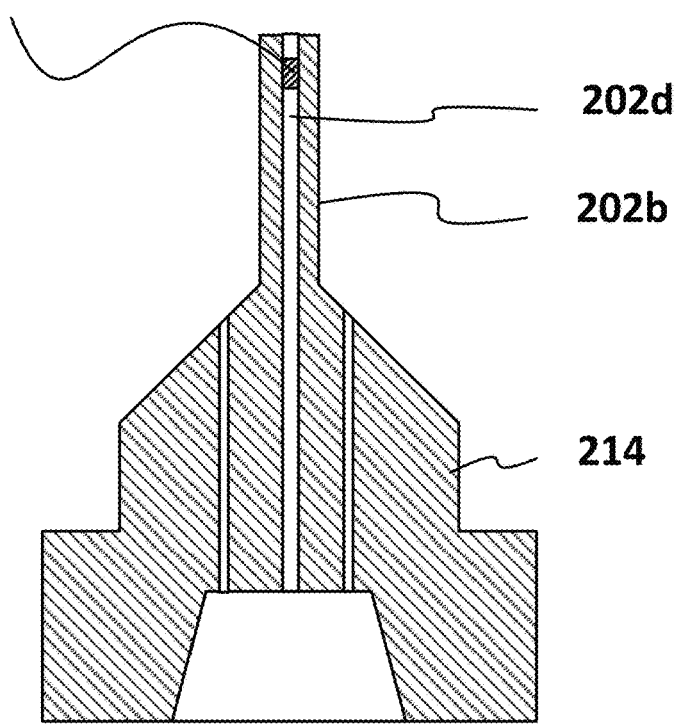
FIG. 18 is a sectional view of a posture of attaching a sample holder of Example 3 to a goniometer according to the same.

Next, the crystalline sponge 200 in which the sample is soaked, together with the sample holder 214 is removed from the applicator 300, and is attached to the goniometer head 15 at the tip of the goniometer 12 together with the sample holder 214, in the posture shown in FIG. 18. In this state, inside the single-crystal X-ray diffractometer 9, X-rays are irradiated to the crystalline sponge 200 from the X-ray tube 11. In this case, the crystalline sponge 200 is held in the sample holding part 202b, and thus X-rays passing through the wall of the sample holding part 202b enter the crystalline sponge 200 inside. Accordingly, in the present Example 3, similarly to Example 2, for example, beam-translucent borosilicate glass, quartz glass and so forth, each of which does not hinder transmission of X-rays as much as possible are selectively used as materials for the sample holding part 202b.

Figure 19:
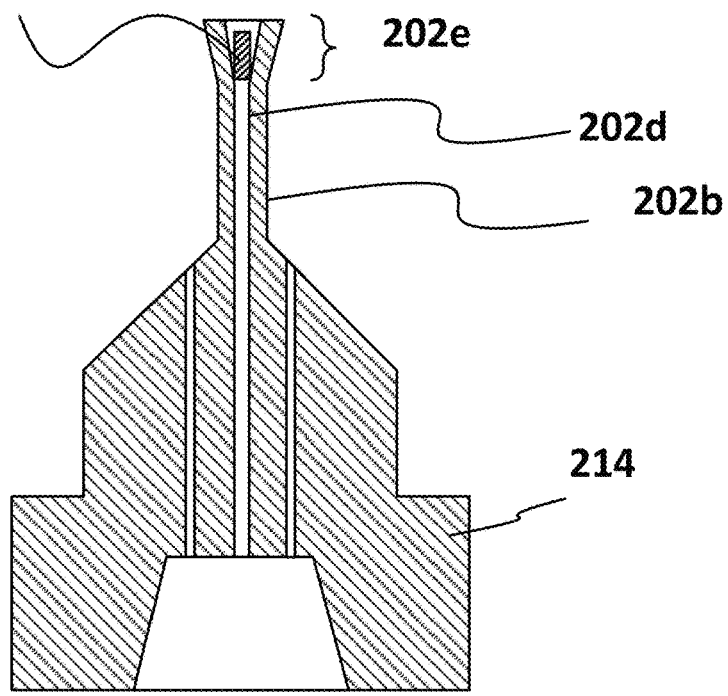
FIG. 19 is a sectional view of a posture of attaching a sample holder of a modified example of the above-described Example 3, to a goniometer.

FIG. 19 shows a modified example of Example 3, and a widening part 202e is provided at the tip part of the sample holding area 202d. According to this configuration, in FIG. 17, the crystalline sponge 200 is easy to be induced into the sample holding area 202d, and after sucking it, the crystalline sponge 200 can be stopped in a narrowed part at the boundary with the widening part 202e that is a part of the sample holding area (through-hole) 202d, and thus holding position of the crystalline sponge 200 can be maintained at the tip part.

Structurally, the crystalline sponge 200 is inserted from the tip side of the sample holding part as shown in FIG. 19. The crystalline sponge 200 can be surely fixed in a narrow portion of the sample holding area 202d by setting the sample holding part side upward to make the crystalline sponge 200 and a solvent that made it possible to be soaked therein together flow inside a pipe from the tip side of the sample holding part. The crystalline sponge 200 together with the solvent (substitution solvent) that made it possible to be soaked therein is introduced into the pipe. In addition, the crystalline sponge 200 may be inserted together with a sample S, or with the sample S and a carrier (for example, a solvent, a carrier or the like), instead of the solvent that made it possible to be soaked therein.

The sample S is introduced from either on the attachment part side or the sample holding part side. Introduction of the sample S {or the sample S and a carrier (hereinafter the same)} into the applicator 300 is performed by a supply pipe 220 inserted in a through-hole, and discharge of the sample S is performed by a discharge pipe 221 inserted in the other through-hole. On the other hand, soaking the sample S in the crystalline sponge 200 is performed by introducing (sucking) the sample S into the pipe of the sample holding area 202d from the sample holding part side. The suction from the tip side of the sample holding part while controlling an introduction speed thereof can prevent the crystalline sponge 200 from being detached from the sample holder. Further, by sucking the sample S with a pipe of the sample holding area 202d, the pipe can also be used as a discharge pipe as it is. In this case, the discharge pipe 221 is inserted in a through-hole of the sample holding area 202d. Further, the through-hole of the sample holding area 202d can also be used for supplying the sample S thereto. In this case, the supply pipe 220 is inserted in the through-hole of the sample holding area 202d.

In addition, in cases of these modified examples, no other through-holes are required. Accordingly, the through-hole of the sample holding area 202d is used when sucking the sample S to be soaked therein from the sample holding part side; when sucking the sample S from the sample holding part side while serving also as discharge of the sample S; and when supplying (introducing) the sample from the attachment part side while serving also as introduction of the sample S. Further, either the sample S is introduced and soaked therein after holding the crystalline sponge 200, or the crystalline sponge 200 is held after soaking the introduced sample S therein is not limited. Further, the widening part 202e is in a reverse taper shape, and thus it is easy to be used to suck the crystalline sponge S after soaking the sample S therein.

Figure 20:
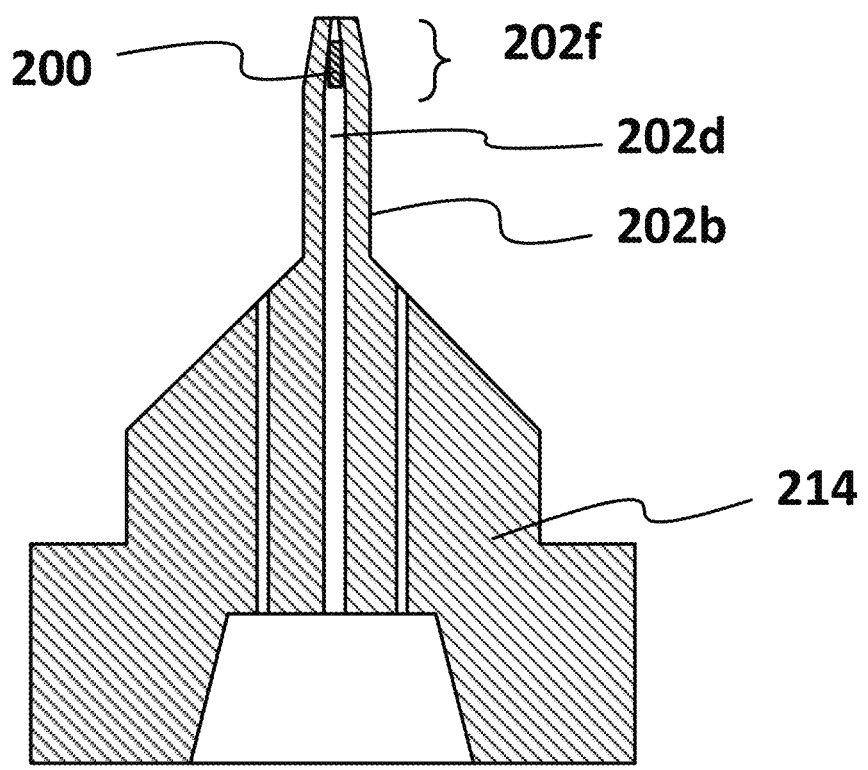
FIG. 20 is a sectional view of a posture of attaching a sample holder of another modified example of the above-described Example 3, to a goniometer.

FIG. 20 shows another modified example of Example 3, and a tapered part 202f is provided at the tip part of the sample holding area 202d. According to this configuration, the crystalline sponge 200 is held in the tapered part 202f that is a part of the sample holding area 202d, and thus it is not penetrated deeply into the sample holding area 202d, and the crystalline sponge 200 holding position can be kept at the tip part.

Structurally, the crystalline sponge 200 is inserted in the sample holder shown in FIG. 20 from the attachment part side. For example, the crystalline sponge 200 can be fixed in a narrow portion of the sample holding area 202d by setting the sample holding part side downward to make the crystalline sponge 200 and a solvent (substitution solvent) that made it possible to be soaked therein together flow inside a pipe from the attachment part side. The crystalline sponge 200 together with the solvent that made it possible to attach the crystalline sponge 200 thereto is introduced thereinto. In addition, the crystalline sponge 200 may be inserted together with a sample S, or with the sample S and a carrier.

The sample S is introduced from either on the attachment part side or the sample holding part side. Introduction of the sample S {or the sample S and a carrier (hereinafter the same)} into the applicator 300 is performed by the supply pipe 220 inserted in a through-hole, and discharge of the sample S is performed by the discharge pipe 221 inserted in the other through-hole. On the other hand, soaking the sample S in the crystalline sponge 200 is performed by introducing (sucking) the sample S into the pipe of the sample holding area 202d from the sample holding part side. The suction from the sample holding part side while controlling an introduction speed thereof can prevent the crystalline sponge 200 from being detached from the sample holder. Further, by sucking the sample S with the pipe of the sample holding area 202d, the pipe can also be used as a discharge pipe as it is. In this case, the discharge pipe 221 is inserted in the through-hole of the sample holding area 202d. Further, the through-hole of the sample holding area 202d can also be used for supplying the sample S thereto. In this case, the supply pipe 220 is inserted in the through-hole of the sample holding area 202d.

In addition, in cases of these modified examples, no other through-holes are required. Accordingly, the through-hole of the sample holding area 202d is used when sucking the sample S to be soaked therein from the sample holding part side; when sucking the sample S from the sample holding part side while serving also as discharge of the sample S; and when supplying (introducing) the sample from the attachment part side while serving also as introduction of the sample S. Further, either the sample S is introduced and soaked therein after holding the crystalline sponge 200, or the crystalline sponge 200 is held after soaking the introduced sample S therein is not limited.

The crystalline sponge 200 can be attached to the sample holder 214 by dropping a crystal from above to below by gravity, and be attached thereto by suction. These are similar not only when having a widening part 202e at the tip part of the sample holding area 202d as shown in FIG. 19, but also when having a tapered part 202f at the tip part of the sample holding area 202d as shown in FIG. 20. That is, it can be attached by using gravity from above if the narrow portion where the crystalline sponge 200 of the sample holding area 202d is caught is set on the lower side, with respect to the position of the crystalline sponge 200. In contrast, it can be attached to the sample holder 214 by sucking the crystalline sponge 200 from below if the narrow portion is set on the upper side, with respect to the position of the crystalline sponge 200.

In addition, even when the narrow portion is set on the lower side, it is possible to also attach the crystalline sponge 200 thereto by suction. When the crystal is attached to the sample holder 214, a soaking step is carried out. In the soaking step, a sample or a carrier (fluid containing a sample and a preserving solvent) is introduced from a direction where the crystal sponge 200 is caught at the narrow portion, and is soaked in the crystal sponge 200. The introduction direction of this sample or carrier may also be either from above or from below. The suction does not necessarily mean only sucking up, but includes the case of pushing out by pressure adjustment.

The crystalline sponge 200 has a very small size, and thus the crystalline sponge 200 is difficult to be attached to the sample holder 214. Thus, it is preferred for a user to use the sample holder 214 to which the crystalline sponge 200 has been attached, but in this case, the crystalline sponge 200 needs to be in a state where it is able to soak, that is, it needs to be carried together with a substitution solvent. Accordingly, it appears that the crystalline sponge 200 is carried in a relatively safe placing state before being able be soaked therein, and is used at site by making the crystalline sponge 200 be in a state where it is able to be soaked therein.

In this case, an operation of fixing the crystalline sponge 200 to the sample holder is arised. In the configuration shown in FIG. 16, the crystalline sponge 200 having very small size needs to be found from a solution, and be sucked at a specific point. Thus, according to the sample holder shown in FIG. 19 or FIG. 20, after fixing the crystalline sponge 200 previously set for being able to be soaked therein to the sample holder, soaking can also be carried out, and thus a series of soaking operations can be performed relatively easily.

In addition, as to the present Example 3, its modified example, and other modified examples, similarly to Example 2, steps of soaking a sample therein, being attached to the goniometer 12, and subsequent irradiating X-rays thereto are always performed in a state where the crystalline sponge 200 is held inside the through-hole of the sample holding part 202b or the sample holding area 202d. Accordingly, a series of the steps are carried out very quickly without giving any damage to the crystalline sponge 200, and thus efficiency, safety, and sureness of operations thereof can be improved.

In addition, a sample holder and a sample holder unit for a crystalline sponge having a structure other than those of the above-described Examples are also applied similarly to the structures of the above-described Examples, and it is clear that it is made possible to quickly and easily perform the operations of soaking a sample in the crystalline sponge 200 held inside the applicator 300, through a fluid (carrier) containing the sample, and precisely attaching the sample holder 214 in which crystallization therein is completed to the tip of the goniometer 12.

Further, according to such a structure, a very small amount of the sample becomes possible to be more surely soaked in the crystalline sponge 200 having very small size by introducing the sample into the sample holding part 202b provided with the crystalline sponge 200 attached into the sample holder 214 or to the tip thereof. Furthermore, the crystalline sponge 200 attached to the sample holding area 202d is located inside the sample holding area 202b, and thus it is made possible to be more quickly, safely and easily handled without being damaged from the outside or being lost to the outside.

As described above in detail, according to a sample holder for a single-crystal X-ray structure analysis apparatus of the present invention, and a sample holder unit therefor, the single-crystal X-ray structure analysis using a very small and fragile crystalline sponge can be quickly, surely and easily performed without accompanying the conventionally required fine and precise operation, even without having specialized knowledge of X-ray structure analysis, in other words, there are provided the sample holder and the sample holder unit each for realizing a very versatile and user-friendly single-crystal X-ray structure analysis apparatus that is capable of high-yield and efficient performance of the single-crystal structure analysis using the crystalline sponge.

In addition, though various Examples according to the present invention are described above, the present invention is not limited to the above-described Examples and includes various modified examples. For example, the above-described Examples describe the entire system in detail in order to facilitate understanding of the present invention, but are not necessarily limited to those having all the configurations that have been described. Further, a part of a configuration of one Example may be replaced with a configuration of another Example; further, a configuration of another Example may be added to a configuration of one Example; and with respect to a part of a configuration of each Example, addition/deletion/replacement of another configuration may be further performed.

The present invention is widely applicable for an X-ray structure analysis apparatus used for searching a material structure, a method therefor, and so forth.

In addition, the present international application claims priority under Japanese Patent Application No. 2018-219780, filed Nov. 22, 2018, and the entire content of Japanese Patent Application No. 2018-219780 is applied to the present international application.

EXPLANATION OF THE SYMBOLS

1 . . . Single-crystal X-ray structure analysis apparatus (whole body), 9 . . . Single-crystal X-ray diffractometer, 11 . . . X-ray tube, 12 . . . Goniometer, 22 . . . X-ray detector, 102 . . . Measurement device, 103 . . . Input device, 104 . . . Image display device, 107 . . . CPU, 108 . . . RAM, 109 . . . ROM, 111 . . . Hard disk, 116 . . . Analysis application software, 117 . . . Measurement application software, 200 . . . Crystalline sponge, 201 . . . Base part, 202 . . . Protrusion part, 202b . . . Sample holding part, 202c . . . Through-hole, 202d . . . Sample holding area, 204, 205 . . . Through-hole, 214 . . . Sample holder, 220, 221 . . . Sample introduction pipe (Pipe), 300 . . . Applicator, 301 . . . Storing space, 302 . . . Opening, and 400 . . . Sample holder unit.

The invention claimed is:

1. A sample holder used in a single crystal X-ray structure analysis apparatus, the sample holder comprising:
   a base part attached to a goniometer in the single-crystal X-ray structure analysis apparatus;
   a sample holding part that is formed in the base part to hold a porous complex crystal capable of soaking the sample in a plurality of fine pores formed therein; and
   a sample introduction structure formed in the base part and introducing the sample to be soaked in the porous complex crystal,
   wherein the sample holding part is formed in a protrusion shape extending from the base part, and is holding the porous complex crystal at the tip part thereof; and the sample is soaked in the porous complex crystal in a state of being held by the sample holding part.

2. The sample holder according to claim 1,
   wherein a through-hole passing from the base part to the tip part in the protrusion shape is formed in the sample holding part, and the sample is soaked in the porous complex crystal in a state of being held inside the through-hole.

3. The sample holder according to claim 2,
   wherein the tip part of the through-hole is formed in a reverse taper shape, and the porous complex crystal is held in a narrowed part at a boundary of the reverse taper shape.

4. The sample holder according to claim 2,
   wherein the tip part of the through-hole is formed in a taper shape, and the porous complex crystal is held in a narrowed part at a boundary of the taper shape.

5. The sample holder according to claim 2,
   wherein the sample introduction structure comprises the through-hole, and the through-hole is used for introducing or discharging the sample.

6. The sample holder according to claim 1,
   wherein the sample holding part is formed as a through-hole in a protrusion shape extending from the base part, and is having a sample holding area inside the through-hole; and the porous complex crystal in which the sample is soaked moves into the sample holding area from the outside of the sample holding area, and is held in the sample holding area.

7. The sample holder according to claim 1,
   wherein the sample holding part is made of an X-ray translucent material.

8. A sample holder unit comprising a sample holder used in a single-crystal X-ray structure analysis apparatus and an applicator for storing the sample holder, the sample holder comprising:
   a base part attached to a goniometer in the single-crystal X-ray structure analysis apparatus;
   a sample holding part formed in the base part to hold the porous complex crystal capable of soaking the sample in a plurality of fine pores formed therein; and
   a sample introduction structure that introduces the sample for soaking the sample in the porous complex, and the applicator comprising:
a storing space for storing the sample holder and an opening, and
a seal part provided on a contact surface with the sample holder stored in the storing space,
wherein the sample introduced through the sample introduction structure is soaked in the porous complex crystal in a state where the sample holder is stored in the applicator.

9. The sample holder unit according to claim 8,
wherein the sample holding part is formed in a protrusion shape extending from the base part, to hold the porous complex crystal at a tip part thereof; and the sample is soaked in the porous complex crystal in a state where the porous complex crystal is held by the sample holding part.

10. The sample holder unit according to claim 8,
wherein the sample holding part is formed in a protrusion shape extending from the base part; the sample introduction structure is a through-hole passing from the base part to the sample holding part; and the sample is soaked in the porous complex crystal in a state where the porous complex crystal is held inside the through-hole.

11. The sample holder unit according to claim 10,
wherein a tip part of the through-hole in the sample holder is formed in a reverse taper shape, and the porous complex crystal is held in a narrowed part at a boundary with the reverse taper shape.

12. The sample holder unit according to claim 10,
wherein a tip part of the through-hole in the sample holder is formed in a taper shape, and the porous complex crystal is held in a narrowed part at a boundary with the taper shape.

13. The sample holder unit according to claim 10,
wherein the sample introduction structure of the sample holder comprises the through-hole, and the through-hole is used for introducing or discharging the sample.

14. The sample holder unit according to claim 8,
wherein the sample holding part is made of an X-ray translucent material.

15. A sample holder unit comprising a sample holder used in a single-crystal X-ray structure analysis apparatus and an applicator in which the sample holder is stored, the sample holder comprising:
a base part attached to a goniometer in the single-crystal X-ray structure analysis apparatus;
a sample holding part formed in the base part and having the sample holding area inside; and
a sample introduction structure for introducing the sample and to be soaked in the porous complex crystal;
and the applicator comprising:
a storing space for storing the sample holder and an opening;
a seal part provided on a contact surface with the sample holder stored in the storing space; and
the porous complex crystal capable of soaking the sample in a plurality of fine pores formed therein;
wherein the porous complex crystal soaks the sample introduced through the sample introduction structure in a state where the sample holder is stored in the applicator; and the sample holding part formed as a through-hole in a protrusion shape extending from the base part has a sample holding area inside the through-hole; and
the porous complex crystal in which the sample is soaked moves into the sample holding area from the outside of the sample holding area, and is held in the sample holding area.

16. The sample holder unit according to claim 15,
wherein a tip part of the through-hole is formed in a reverse taper shape, and the porous complex crystal in which the sample is soaked is held in a narrowed part at a boundary with the reverse taper shape.

17. The sample holder unit according to claim 15,
wherein a tip part of the through-hole is formed in a taper shape, and the porous complex crystal in which the sample is soaked is held in a narrowed part at a boundary with the taper shape.

18. The sample holder unit according to claim 15,
wherein the sample introduction structure of the sample holder comprises the through-hole, and the through-hole is used for introducing or discharging the sample.

19. The sample holder unit according to claim 15,
wherein the sample holding area is made of an X-ray translucent material.

20. A soaking method for soaking a sample in a porous complex crystal, the soaking method comprising:
a setting step of setting, to a soaking apparatus, a sample holder comprising a sample introduction structure into which the sample is introduced; and a sample holding part formed in a protrusion shape as a through-hole, the sample holding part having a sample holding area for holding the porous complex crystal in a predetermined area inside the through-hole, and an applicator having a storing space for storing the sample holder and an opening;
an insertion step of inserting a sample introduction pipe of the soaking apparatus in the sample introduction structure;
an introduction step of introducing the sample thereinto through the sample introduction pipe; and
a soaking step of soaking the introduced sample in the porous complex crystal.

21. The method according to claim 20, further comprising a holding step of holding, in the sample holding area, the porous complex crystal moved into the sample holding area in the sample holding part from the outside of the sample holding area in the sample holding part, after the soaking step,
wherein the porous complex crystal is arranged in the storing space, and in the soaking step, the sample introduced into the storing space is soaked in the porous complex crystal.

22. The method according to claim 21,
wherein in the holding step, the porous complex crystal is held in a narrowed part inside the through-hole.

23. The method according to claim 22,
wherein a tip part of the through-hole is formed in a reverse taper shape, and in the holding step, the porous complex crystal is moved toward the narrowed part at a boundary with the reverse taper shape from the opening on a side of the reverse taper shape of the through-hole, and is held by the narrowed part.

24. The method according to claim 23,
wherein in the introduction step, the sample is introduced toward a direction where the porous complex crystal is moved.

25. The method according to claim 22,
wherein a tip part of the through-hole is formed in a taper shape, and in the holding step, the porous complex crystal is moved toward the narrowed part at a part of the taper shape from the opening on a side opposed to a side of the taper shape of the through-hole, and is held by the narrowed part.

26. The method according to claim 20, further comprising a holding step of holding, in the sample holding area, the porous complex crystal moved into the sample holding area in the sample holding part from the outside of the sample holding area in the sample holding part, before the soaking step, wherein in the soaking step, the sample introduced into the sample holding area is soaked in the porous complex crystal.

\* \* \* \* \*